United States Patent
Bell et al.

(10) Patent No.: US 12,014,468 B2
(45) Date of Patent: Jun. 18, 2024

(54) CAPTURING AND ALIGNING THREE-DIMENSIONAL SCENES

(71) Applicant: Matterport, Inc., Sunnyvale, CA (US)

(72) Inventors: Matthew Bell, Sunnyvale, CA (US); David Gausebeck, Sunnyvale, CA (US); Michael Beebe, Sunnyvale, CA (US)

(73) Assignee: Matterport, Inc., Sunnyvale, CA (US)

( * ) Notice: Subject to any disclaimer, the term of this patent is extended or adjusted under 35 U.S.C. 154(b) by 74 days.

(21) Appl. No.: 17/165,653

(22) Filed: Feb. 2, 2021

(65) Prior Publication Data

US 2021/0166495 A1 Jun. 3, 2021

Related U.S. Application Data

(60) Continuation of application No. 14/070,430, filed on Nov. 1, 2013, now Pat. No. 10,909,770, which is a
(Continued)

(51) Int. Cl.
*G06T 19/20* (2011.01)
*H04N 13/10* (2018.01)
(Continued)

(52) U.S. Cl.
CPC .............. *G06T 19/20* (2013.01); *H04N 13/10* (2018.05); *H04N 13/106* (2018.05);
(Continued)

(58) Field of Classification Search
CPC .... G06T 19/20; H04N 13/106; H04N 13/204; H04N 13/246; H04N 13/156; H04N 13/10
(Continued)

(56) References Cited

U.S. PATENT DOCUMENTS 6,396,496 B1 5/2002 Pfister
7,054,478 B2 5/2006 Harman
(Continued)

FOREIGN PATENT DOCUMENTS

WO 2007102663 9/2007

OTHER PUBLICATIONS

International Search Report and Written Opinion for International Patent Application Serial No. PCT/US2019/053040 dated Jan. 6, 2020, 7 pages.
(Continued)

*Primary Examiner* — Robert J Hance
*Assistant Examiner* — Kristin Dobbs
(74) *Attorney, Agent, or Firm* — Ahmann Kloke LLP

(57) ABSTRACT

Systems and methods for building a three-dimensional composite scene are disclosed. Certain embodiments of the systems and methods may include the use of a three-dimensional capture device that captures a plurality of three-dimensional images of an environment. Some embodiments may further include elements concerning aligning and/or mapping the captured images. Various embodiments may further include elements concerning reconstructing the environment from which the images were captured. The methods disclosed herein may be performed by a program embodied on a non-transitory computer-readable storage medium when executed the program is executed a processor.

20 Claims, 14 Drawing Sheets

Related U.S. Application Data division of application No. 13/776,688, filed on Feb. 25, 2013, now Pat. No. 9,324,190.

(60) Provisional application No. 61/603,221, filed on Feb. 24, 2012.

(51) Int. Cl.
  *H04N 13/106* (2018.01)
  *H04N 13/156* (2018.01)
  *H04N 13/204* (2018.01)
  *H04N 13/246* (2018.01)

(52) U.S. Cl.
  CPC ......... *H04N 13/156* (2018.05); *H04N 13/204* (2018.05); *H04N 13/246* (2018.05); *H04N 2213/001* (2013.01)

(58) Field of Classification Search
  USPC .......................................................... 348/46
  See application file for complete search history.

(56) References Cited

U.S. PATENT DOCUMENTS

| | | | |
|---|---|---|---|
| 7,697,749 | B2 | 4/2010 | Ogawa |
| 8,602,887 | B2* | 12/2013 | Tardif .................. A63F 13/428 463/31 |
| 8,957,919 | B2 | 2/2015 | Han |
| 8,973,029 | B2 | 3/2015 | Deshpande |
| 9,001,227 | B2 | 4/2015 | Aleksic |
| 9,609,307 | B1 | 3/2017 | Lopez |
| 10,154,244 | B2 | 12/2018 | Peterson |
| 10,860,100 | B2 | 12/2020 | Osterhout |
| 2003/0227615 | A1 | 12/2003 | Montgomery |
| 2003/0231788 | A1 | 12/2003 | Yukhin |
| 2004/0023612 | A1 | 2/2004 | Kriesel |
| 2005/0257748 | A1 | 11/2005 | Kriesel |
| 2006/0244746 | A1 | 11/2006 | England |
| 2008/0170123 | A1 | 7/2008 | Albertson |
| 2008/0310757 | A1 | 12/2008 | Wolberg |
| 2010/0097444 | A1 | 4/2010 | Lablans |
| 2010/0194860 | A1 | 8/2010 | Mentz |
| 2011/0018973 | A1 | 1/2011 | Takayama |
| 2011/0102763 | A1 | 5/2011 | Brown |
| 2011/0157696 | A1 | 6/2011 | Bennett |
| 2011/0211042 | A1 | 9/2011 | Thorpe |
| 2012/0105574 | A1 | 5/2012 | Baker |
| 2012/0162366 | A1 | 6/2012 | Ninan |
| 2012/0185094 | A1* | 7/2012 | Rosenstein .......... G05D 1/0272 901/1 |
| 2012/0223937 | A1 | 9/2012 | Bendall |
| 2013/0063550 | A1 | 3/2013 | Ritchey |
| 2013/0103303 | A1 | 4/2013 | Lynch |
| 2015/0288877 | A1 | 10/2015 | Glazer |
| 2016/0005179 | A1 | 1/2016 | Petyushko |
| 2016/0249039 | A1 | 8/2016 | Tran |
| 2016/0291136 | A1 | 10/2016 | Lindskog |
| 2017/0278289 | A1 | 9/2017 | Marino |
| 2018/0139431 | A1 | 5/2018 | Simek |
| 2018/0144555 | A1 | 5/2018 | Ford |
| 2018/0253869 | A1 | 9/2018 | Yumer |
| 2018/0276841 | A1 | 9/2018 | Krishnaswamy |
| 2019/0259170 | A1 | 8/2019 | Qi |

OTHER PUBLICATIONS

International Serch Report and Written Opinion for International Patent Application Serial No. PCT/US2018/015330 dated Apr. 19, 2018, 11 pages.

Birchfield, Stan et al. Depth Discontinuities by Pixel-To-Pixel Stereo. International Journal of Computer Vision. Dec. 1999. vol. 35, Issue 3 pp. 269-293.

Davidson, Andrew et al. MonoSLAM: Real-Time Single Camera SLAM. IEEE Transactions on Pattern Analysis and Machine Intelligence. Jun. 2007, vol. 29, IEEE Computer Society.

Hirschmuller, Heiko. Accurate and Efficient Stereo Processing By Semi-Global Matching and Mutual Information. IEEE Computer Society Conference on Computer Vision and Pattern Recognition. 2005. vol. 2. pp. 807-814. IEEE Computer Society Washington, D.C.

Hsoni, Asmaa et al. Secrets of Adaptive Support Weight Techniques For Local Stereo Matching. Digital Representations of the Real World: How to Capture, Model, and Render Visual Reality. Computer Vision and Image Understanding. 2013. vol. 117, pp. 620-632. Elsevier Science Inc. New York, NY, USA.

Kolmogorov, V. et al. Computing Visual Correspondence with Occlusion Using Graph Cuts. 3D-TV System with Depth-Image-Based Rendering Architectures, Techniques and Challenges. Computer Vision. 2001. ICCV, IEEE.

In, Guo-Shiang et al., "2D to 3D Image Conversion Based on Classification of Background Depth Profiles," Proceedings of the 5th Pacific Rim Symposium on Advances in Image and Video Technology (PSIVT 2011), Part II, pp. 381-392, Nov. 2011.

Peng, Lim Wen et al., "3D Object Reconstruction and Representation Using Neural Networks," Proceedings of the 2nd International Conference on Computer Graphics and Interactive Techniques in Australasia and South East Asia (GRAPHITE '04) pp. 139-147, Jun. 2004.

Sun, Jian. Stereo Matching Using Belief Propogation. IEEE Transactions on Pattern Analysis and Machine Intelligence. 2003, vol. 25. Issue 7. pp. 787-800. IEEE Computer Society Washington, D.C. USA.

Szeliski, Rick et al. A Comparative Study of Energy Minimization Methods For Markov Random Fields with Smoothness-Based Priors. IEEE Transactions on Pattern Analysis and Machine Intelligence. Jun. 2008, pp. 1068-1080 vol. 30, Issue 6. IEEE.

Xiong, "Eliminating Ghosting Artifacts for Panoramic Images," 11th IEEE International Symposium on Multimedia, Jan. 2009, pp. 432-437, IEEE, Palo Alto, CA, USA, 6 pages.

Yeh, Raymond et al. Semantic Image Inpainting With Perceptual and Contextual Losses. Dept. of Electrical and Computer Engineering University of Illinois at Urbana-Champaign. 2016.

Zabih, Ramin et al. Non-Parametric Local Transforms for Computing Visual Correspondence. European Conference on Computer Vision. 1994. vol. 3, pp. 151-158. Springier-Verlag New York, Inc., Secaucus, NJ, USA.

Non Final Office Action for U.S. Appl. No. 16/141,630, dated Aug. 26, 2021, 9 pages.

Notice of Allowance for U.S. Appl. No. 16/141,638, dated Jun. 30, 2021, 8 pages.

Notice of Allowance for U.S. Appl. No. 16/141,649, dated Jul. 13, 2021, 8 pages.

Non-Final Office Action for U.S. Appl. No. 13/776,688, dated May 29, 2015, 102 pages.

Notice of Allowance for U.S. Appl. No. 13/776,688, dated Dec. 18, 2015, 28 pages.

Non-Final Office Action for U.S. Appl. No. 14/070,426, dated Dec. 17, 2015, 38 pages.

Final Office Action for U.S. Appl. No. 14/070,426, dated Jun. 30, 2016, 38 pages.

Non-Final Office Action for U.S. Appl. No. 14/070,426 dated Oct. 11, 2016, 45 pages.

Final Office Action for U.S. Appl. No. 14/070,426 dated May 4, 2017, 78 pages.

Non-Final Office Action for U.S. Appl. No. 14/070,426, dated Jan. 18, 2018, 50 pages.

Final Office Action for U.S. Appl. No. 14/070,426 dated Sep. 13, 2018, 52 pages.

Notice of Allowance for U.S. Appl. No. 14/070,426 dated Jul. 11, 2019, 24 pages.

Non-Final Office Action for U.S. Appl. No. 14/070,427, dated Feb. 11, 2016, 42 pages.

Final Office Action for U.S. Appl. No. 14/070,427, dated Aug. 11, 2016, 40 pages.

(56) References Cited

OTHER PUBLICATIONS

Non-Final Office Action for U.S. Appl. No. 14/070,427, dated Nov. 10, 2016, 43 pages.
Final Office Action for U.S. Appl. No. 14/070,427, dated May 18, 2017, 55 pages.
Notice of Allowance for U.S. Appl. No. 14/070,427 dated Sep. 5, 2019, 20 pages.
Non-Final Office Action for U.S. Appl. No. 14/070,428, dated Feb. 11, 2016, 44 pages.
Final Office Action for U.S. Appl. No. 14/070,428, dated Sep. 9, 2016, 40 pages.
Non-Final Office Action for U.S. Appl. No. 14/070,428, dated Jan. 12, 2017, 46 pages.
Final Office Action for U.S. Appl. No. 14/070,428, dated Sep. 5, 2017, 68 pages.
Notice of Allowance for U.S. Appl. No. 14/070,428 dated Sep. 5, 2019, 19 pages.
Non-Final Office Action for U.S. Appl. No. 14/070,429, dated Jan. 26, 2016, 53 pages.
Final Office Action for U.S. Appl. No. 14/070,429, dated Sep. 8, 2016, 52 pages.
Non-Final Office Action for U.S. Appl. No. 14/070,429, dated Jan. 12, 2017, 55 pages.
Final Office Action for U.S. Appl. No. 14/070,429, dated Aug. 31, 2017, 77 pages.
Notice of Allowance for U.S. Appl. No. 14/070,429 dated Sep. 4, 2019, 20 pages.
Non-Final Office Action for U.S. Appl. No. 14/070,430, dated Jan. 21, 2016, 17 pages.
Final Office Action for U.S. Appl. No. 14/070,430, dated Oct. 20, 2016, 45 pages.
Non-Final Office Action for U.S. Appl. No. 14/070,430, dated Jun. 15, 2017, 48 pages.
Final Office Action for U.S. Appl. No. 14/070,430, dated Dec. 28, 2017, 58 pages.
Notice of Allowance for U.S. Appl. No. 14/070,430, dated Oct. 5, 2020, 10 pages.
Non-Final Office Action for U.S. Appl. No. 15/417,162 dated May 9, 2019, 53 pages.
Final Office Action for U.S. Appl. No. 15/417,162 dated Dec. 4, 2019, 31 pages.
Notice of Allowance for U.S. Appl. No. 15/417,162 dated Jul. 14, 2020, 9 pages.
Non-Final Office Action for U.S. Appl. No. 16/141,558 dated Sep. 25, 2020, 31 pages.
Notice of Allowance for U.S. Appl. No. 16/141,558 dated Mar. 19, 2021, 8 pages.
Non-Final Office Action for U.S. Appl. No. 16/141,630 dated Jan. 26, 2021, 10 pages.
Non-Final Office Action for U.S. Appl. No. 16/141,638, dated Feb. 5, 2021, 13 pages.
Non-Final Office Action for U.S. Appl. No. 16/141,649 dated Mar. 4, 2021, 15 pages.
Non-Final Office Action for U.S. Appl. No. 16/559,135 dated Apr. 14, 2022, 14 pages.
Notice of Allowance for U.S. Appl. No. 16/141,630, dated Nov. 17, 2021, 10 pages.
European Patent application No. 19864640.8, Extended European Search Report dated May 23, 2022, 13 Pages.
Notice of Allowance for U.S. Appl. No. 16/559,135 dated Oct. 18, 2022, 7 pages.
Su Yu-Chuan et al., Learning Spherical Convolution for Fast Features from 360 deg Imagery, NIPS'17: Proceedings of the 31st International Conference on Neural Information Processing Systems, Aug. 2, 2017, retrieved from the Internet: URL:https://proceedings.neurips.cc/paper/2017/file/0c74b7f78409a4022a2c4c5a5ca3ee19-Paper.pdf.
Zhao Qiang et al., Distortion-aware CNNs for Spherical Images, Proceedings of the Twenty-Seventh International Joint Conference on Artificial Intelligence, Jul. 1, 2018, pp. 1198-1204, retrieved from the internet: url: https://www.jcai.org/proceedings/2018/01647.pdf.
Zioulis Nikolaos et al., OmniDepth: Dense Depth Estimation for Indoors Spherical Panoramas, Sep. 16, 2018, pp. 453-471, vol. 11210, Springer International Publishing, Cham.
Non-Final Office Action for U.S. Appl. No. 18/308,639 dated Oct. 5, 2023, 7 pages.
Final Office Action for U.S. Appl. No. 17/654,989 dated Jan. 8, 2024, 9 pages.
Final Office Action for U.S. Appl. No. 18/308,639 dated Feb. 15, 2024, 15 pages.
Notice of Allowance for U.S. Appl. No. 17/654,989 dated Mar. 21, 2024, 8 pages.

* cited by examiner

Figure 8
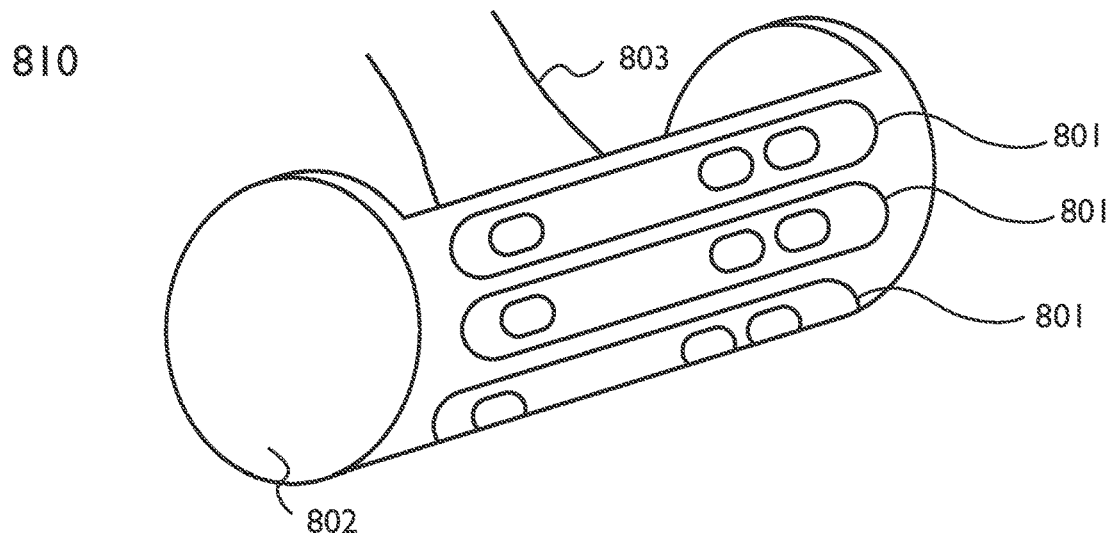
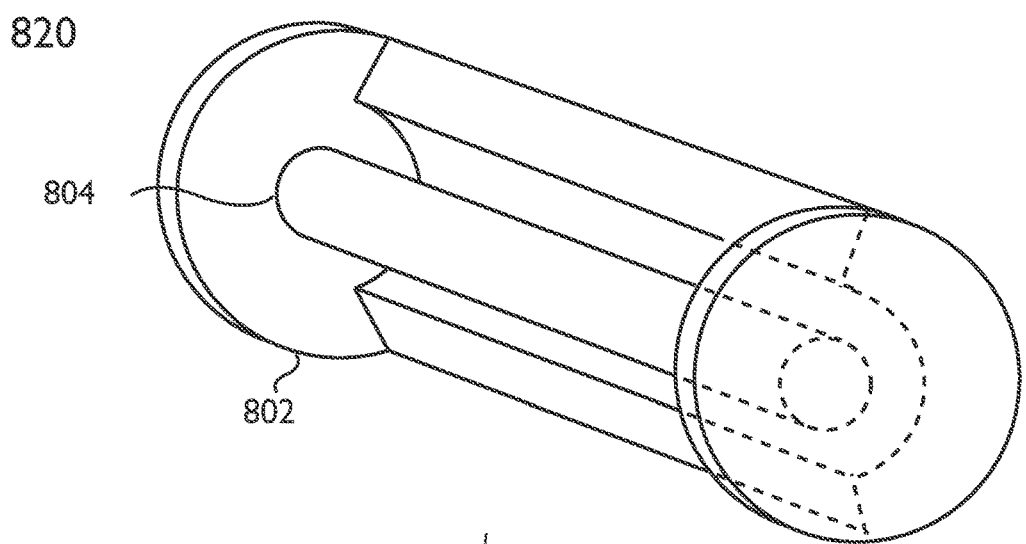
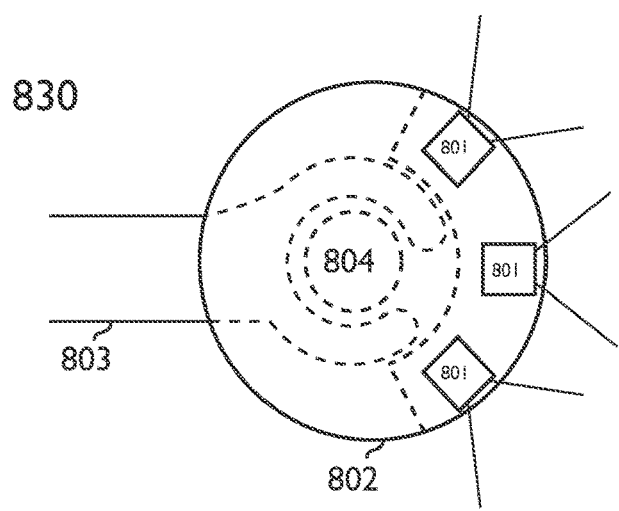

Figure 9 - Various methods of assessing alignment using 2D information

Figure 10 - Supplemental Use of 2D Information in 3D Scene Alignment Process

Figure 11 - Data and Control Flow in a 3D Reconstruction System Utilizing a Fixed-Position Mount

CAPTURING AND ALIGNING THREE-DIMENSIONAL SCENES

CROSS-REFERENCE TO RELATED APPLICATION

This application is a continuation of U.S. patent application Ser. No. 14/070,430, filed on Nov. 1, 2013, entitled "CAPTURING AND ALIGNING THREE-DIMENSIONAL SCENES," which is a divisional of U.S. patent application Ser. No. 13/776,688, filed on Feb. 25, 2013, entitled, "CAPTURING AND ALIGNING THREE-DIMENSIONAL SCENES," now issued as U.S. Pat. No. 9,324,190, which claims the priority benefit of U.S. Provisional Patent Application No. 61/603,221, filed on Feb. 24, 2012, entitled "CAPTURING AND ALIGNING THREE-DIMENSIONAL SCENES." The foregoing disclosures are incorporated herein by reference.

BACKGROUND

Field of Invention

The present invention generally relates to the field of 3-Dimensional (3D) capture of the physical world. More specifically, the present invention relates to capturing and aligning multiple 3D scenes with one another.

Description of the Related Art

While methods for capturing 3D information have existed for over a decade, such methods are traditionally expensive and require complex hardware such as light detection and ranging (LIDAR) sensors.

The emergence of 3D capture devices that capture color as well as less expensive 3D capture devices such as the PrimeSense™ Ltd. hardware in Microsoft Corporation's Kinect™ have made it possible for 3D scenes and objects to be automatically reconstructed from multiple 3D captures by non-technical users. Current alignment software remains limited in its capabilities and ease of use. Existing alignment methods, such as the Iterative Closest Point algorithm (ICP), require users to manually input an initial rough alignment. Such manual input typically exceeds the capabilities of most non-technical users.

3D reconstruction technology, however, should be distinguished from 3D filming techniques as the latter do not perform any 3D reconstruction. 3D filming techniques, instead, capture a scene from two different points of view so that those scenes may later be shown to a viewer via a 3D display. The 3D geometry of the captured scene may never be calculated by a computer. The raw stereo image may simply be passed on to the viewer for perception.

SUMMARY

A system for building a three-dimensional composite scene includes a three-dimensional capture device for capturing a plurality of three-dimensional images of an environment and a process for executing instructions stored in memory. When the instructions are executed by the processor, the processor aligns the plurality of three-dimensional images in a common space to obtain mapping data regarding the environment. The system may also include a rendering device for displaying a three-dimensional constructions of the environment based on the mapping data.

A method for building a three-dimensional composite scene may include capturing a plurality of three-dimensional images of an environment. The method may further include executing instructions stored in memory by a processor. Execution of the instructions by the processor may align the plurality of three-dimensional images in a common space to obtain mapping data regarding the environment. The method may further include generating a three-dimensional reconstruction of the environment based on the mapping data. The method may be performed by a program embodied on a non-transitory computer-readable storage medium when executed the program is executed a processor.

BRIEF DESCRIPTION OF THE DRAWINGS

FIG. 8 illustrates a still further additional physical configuration for capturing 3D data.

DETAILED DESCRIPTION

Physical Form Factors

Figure 1:
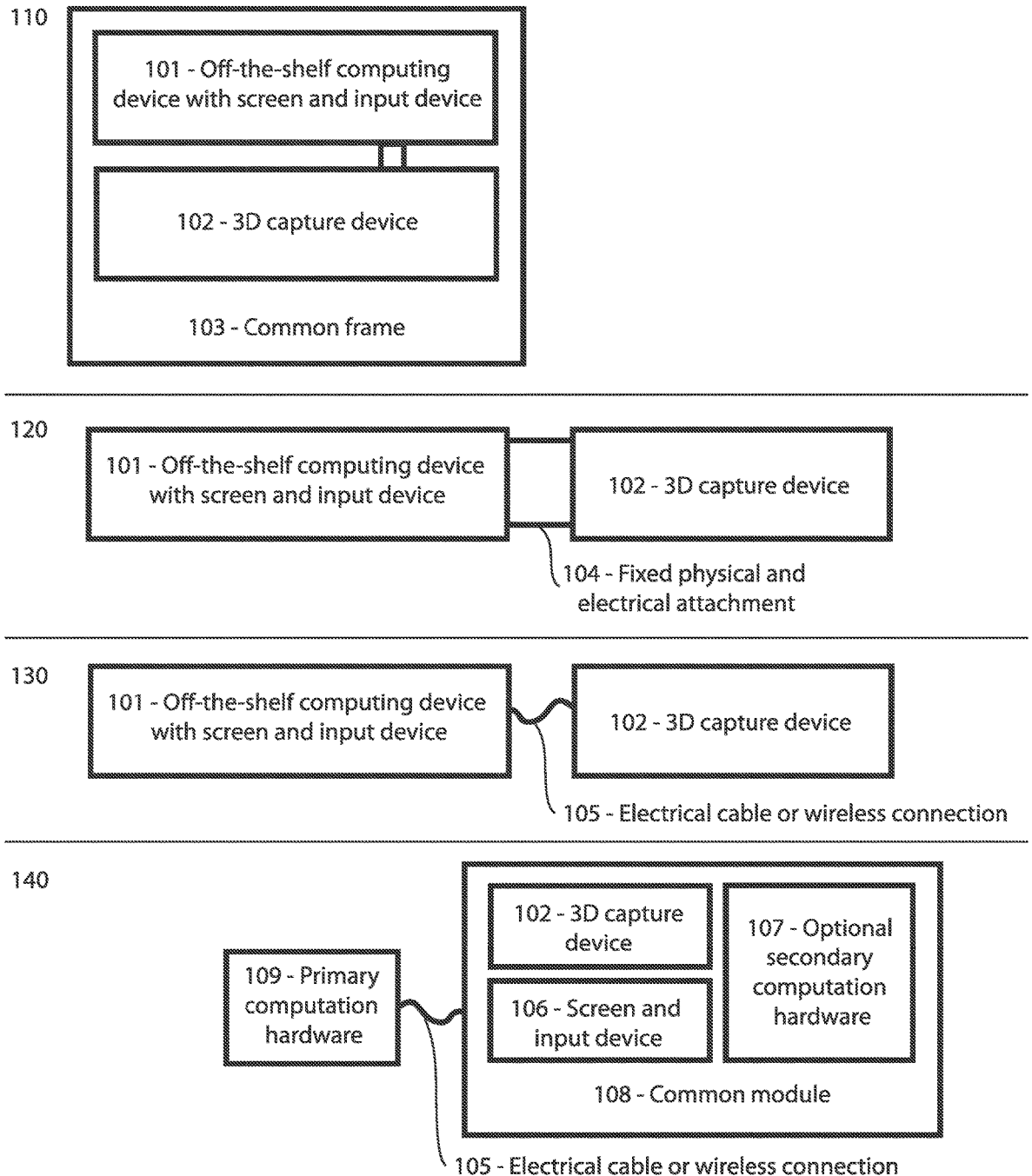
FIG. 1 illustrates exemplary arrangements of capture components.

A variety of physical form factors for the 3D reconstruction system are possible. Some possible configurations are shown in FIGS. 1, 5, 6, 7, 8, and 14.

In one embodiment, the 3D capture device and any optional auxiliary capture devices, computing hardware, user input devices (e.g., touchscreens, buttons, keys, gesture controls, mice, touchpads, etc.), and display screen are packaged into a single module. This module may be held using one or two hands or may be mounted on another part of the body of the user. The module may contain one or more handles or grips allowing the user to manage the module more easily. The module may be fully integrated into a single package, or may consist of a common frame that allows the various components to be mounted together.

In one embodiment 110, a standard phone, tablet, or other computing device 101 may be mounted into a common frame 103 that physically and electrically couples it to the 3D capture hardware 102, and optionally a physical handle or handles. Multiple methods for attaching the computing device may be implemented. In one embodiment, a molded docking station is used for attachment; the molded docking station is physically formed into an inverse of the shape of part of computing device 101 and optionally includes an appropriate connector for communicative coupling between computing device 101 and 3D capture hardware 102.

In another embodiment, the mobile docking station is hinged thereby allowing it to swing out to allow a user to more easily attach computing device 101. This hinged docking station may be accompanied by one or more clips, straps, or holders that are moved into place to hold computing device 101 once it is swung into position inside or adjacent to common frame 103. In another embodiment, the attachment is accomplished via one or more adjustable clips that can be fit around the edges of computing device 101 to hold it in place.

In an alternate embodiment 120, the 3D capture hardware 102 may physically and electrically attach 104 to a standard phone, tablet, or other computing device, allowing it to function as an accessory.

In another embodiment 130, the 3D capture device 102 is physically separated from the primary computing hardware, display, and some or all of the controls 101. These two modules (101,102) may communicate wirelessly or may be communicatively connected via a cable 105 for communication, which may optionally provide power to the 3D capture device. Each of the two modules (101, 102) may contain handles or other physical appendages or shapes to improve the ability of a user to hold the same. For example, the 3D capture device 102 may be mounted atop a handle, on a helmet, or on another attachment device, and the computing/display module may contain a grip, mitt, wrist strap, or other attachment device.

In another embodiment 140, the 3D capture device 102, some or all of the controls 106, and a display 106 are all mounted on a single module 108, and the primary computing hardware 109 is in another physical module. Some secondary computing hardware 107 may be present on the first module as necessary to perform initial 3D data processing, data decimation, display, handling communication with the second module, or to effectuate further uses. Data decimation may include a reduction in resolution; full-resolution data may be kept locally for later transmittal or processing. The two modules may communicate wirelessly or may be communicatively connected via a cable, which may further provide power in either direction 105.

The information communicated may include, but is not limited to, user interface input events, information for display, changes to 3D capture device or computer configuration, and unprocessed or processed data from the 3D capture device. Each of the two modules may contain handles or other physical appendages or shapes to improve the ability for a user to handle the same. The primary computing hardware may be placed in a variety of locations such as a handheld device, in a storage pouch or pocket, on a cart, sitting a distance away from the user, or in a remote location such as a datacenter or as a part of a cloud computing service.

Figure 6:
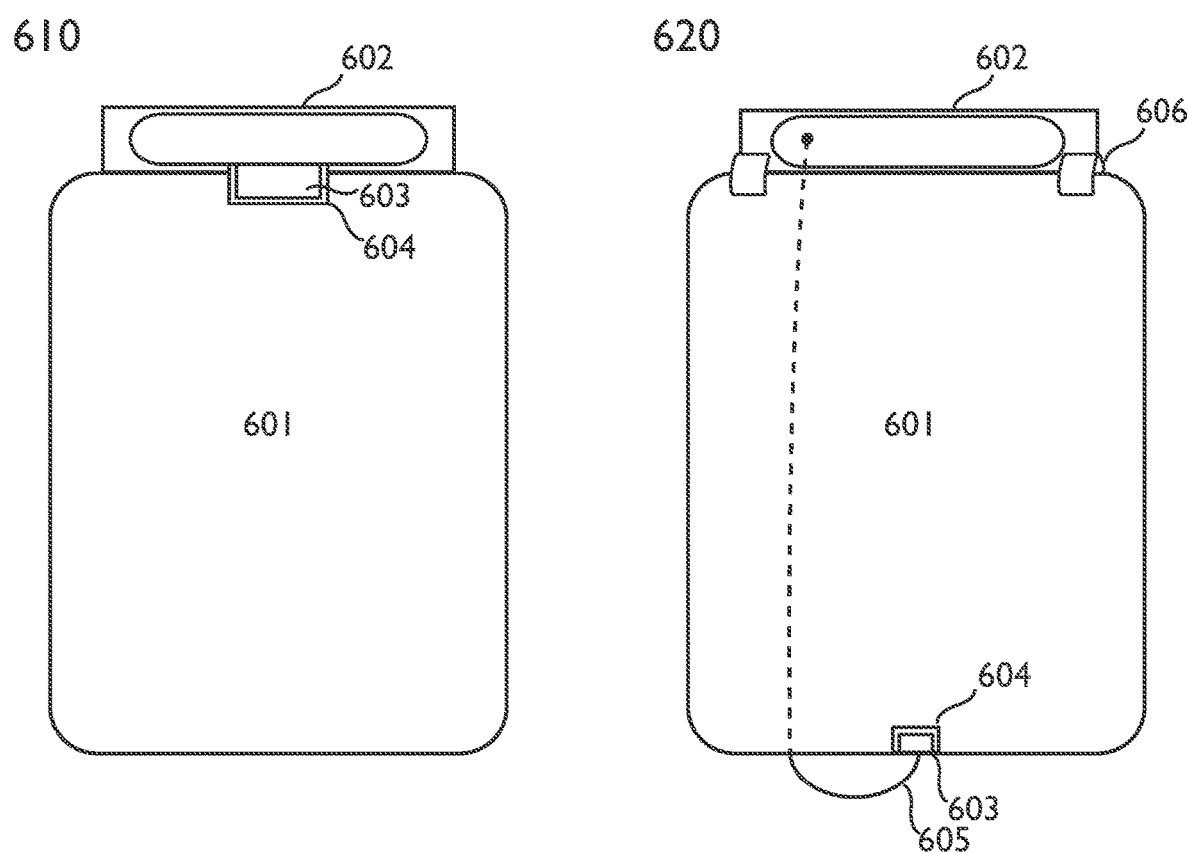
FIG. 6 illustrates another additional physical configuration for capturing 3D data.

FIG. 6 shows an example of two specific embodiments 610 and 620 that utilize an off-the-shelf mobile computing device 601 such a smartphone or tablet. In embodiment 610 the 3D capture hardware 602 physically attaches to a data port 604 of mobile computing device 601 via connector 603. This data connection between 603 and 604 allows captured 3D data to be sent from 3D capture hardware 602 to mobile computing device 601. Said connection may also allow mobile computing device 601 to send control information to 3D capture hardware 602. The connection between 603 and 604 may also provide physical support for stabilizing and holding the position of 602 relative to 601. Alternately, 602 may be shaped such that it fits snugly over the edge of 601.

In embodiment 620 the 3D sensor 602 is physically attached to mobile computing device 601 via one or more clips 606. These clips 606 may have a soft material such as foam on their attachment surfaces to prevent damage to device 601. Clips 606 may be adjustable to accommodate a mobile computing device 601 of various possible thicknesses. 3D capture hardware 602 is communicatively coupled to device 601 for transfer of 3D data and control information, either via data cable 605 that plugs connector 603 to data port 604 or via a wireless connection (not shown).

The 3D capture hardware 602 may contain, in one or more embodiments, additional components such as a battery to power 3D capture hardware 602, onboard computing to perform initial processing of captured 3D data, and/or a wireless communication system for wirelessly transferring data. Numerous wireless data transfer protocols such as 802.11 and Bluetooth may be used. The 3D capture hardware 602 may also contain multiple 2D capture devices pointed at different angles in order to obtain a broader field of view.

Figure 7:
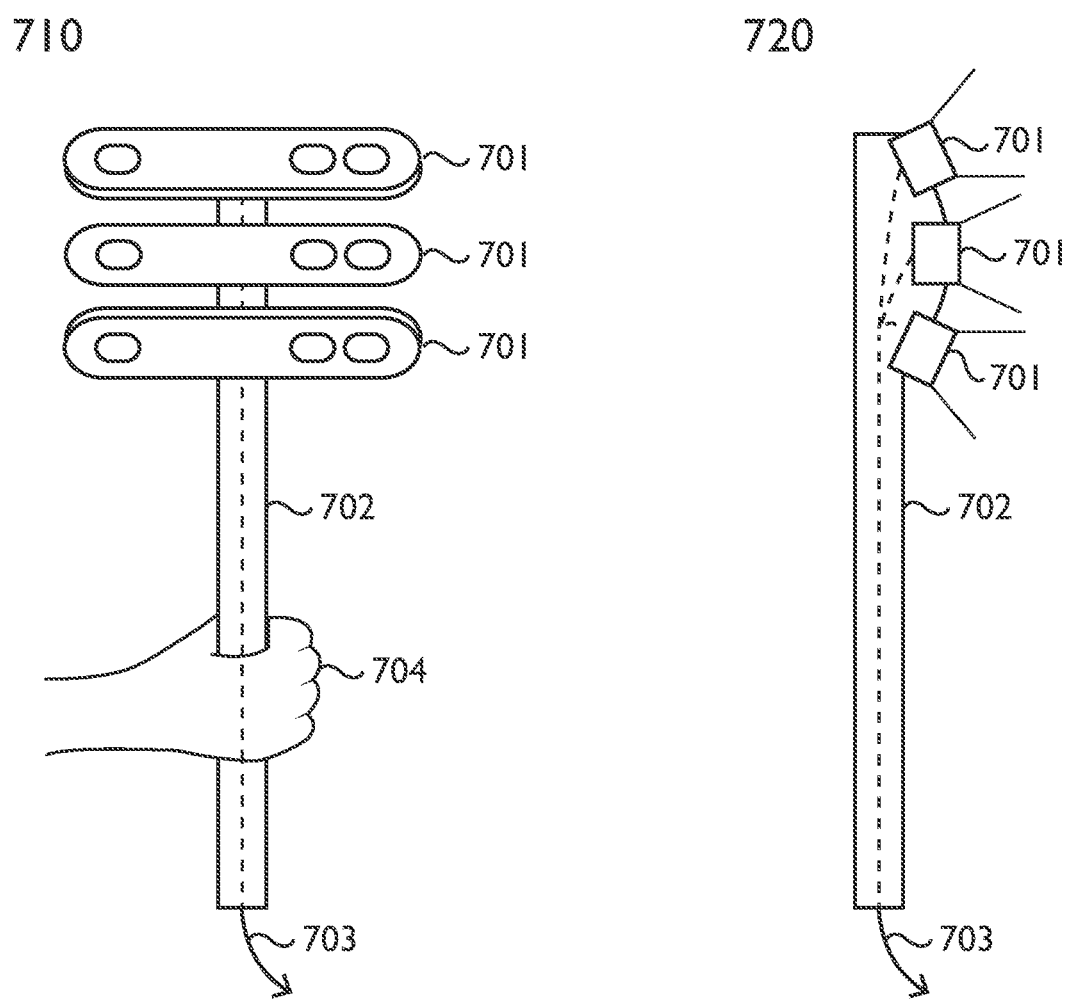
FIG. 7 illustrates yet another additional physical configuration for capturing 3D data.

While FIG. 1 and FIG. 6 show an off-the-shelf computing device with screen and input device 101, any custom computing device may also be used in its place. FIG. 7 shows two views 710 and 720 of a standalone 3D capture system that is communicatively coupled, either via a data cable or a wireless connection, to a mobile computing device (not shown). View 710 shows the 3D capture devices pointed out of the surface of the diagram, while view 720 shows a side view in cross section. One or more 3D capture devices 701 are attached to a common frame 702. In an embodiment involving multiple 3D capture devices 701, such devices may be arranged such that their fields of view overlap thereby allowing them to collectively cover a very large field of view.

Common frame 702 may be pole-shaped, thereby allowing it to be used to reach physically high or generally inaccessible locales. Frame 702 may also contain or be equipped with a grip that allows a user to more readily use their hand 704 for support and positioning. Common frame 702 may contain a data cable 703 that allows data from 3D capture device(s) 701 to be sent to a mobile computing device (not shown). Common frame 702 may contain a pivoting mechanism that allows the user to pivot one or more 3D capture devices 701. This pivoting mechanism may be remote, for example allowing the pivoting to be controlled by hand from position 704.

FIG. 8 shows three views—810, 820, and 830—of another embodiment of a standalone 3D capture system. In this embodiment, the capture system is communicatively coupled via a data cable or a wireless connection to a mobile computing device (not shown). View 810 shows one arrangement of the 3D capture hardware. View 320 shows detail of one embodiment of a handle 804. View 330 shows the 3D capture system in cross section. Enclosure 802 contains one or more 3D capture devices 801 as well as a handle 804 allowing for management and positioning by the hand 803 of a user. Enclosure 802 may also contain onboard batteries, computation, and wireless communication systems (not shown) thereby allowing for transmittal of processed or unprocessed data from 3D capture devices 801 to a mobile computing device (not shown).

The handle 804 may be a rod, a strap of fabric, a glove, a molded grip, or some other shape. The handle 804 may alternatively be hinged or otherwise flexible in its attachment to enclosure 802 to allow it to swing; thus the rest of the enclosure 802 may hang from the handle 804 when held by the hand 803 of a user. Other configurations and implementations are envisioned and would be understood by one of ordinary skill in the art in light of the present specification.

Figure 14:
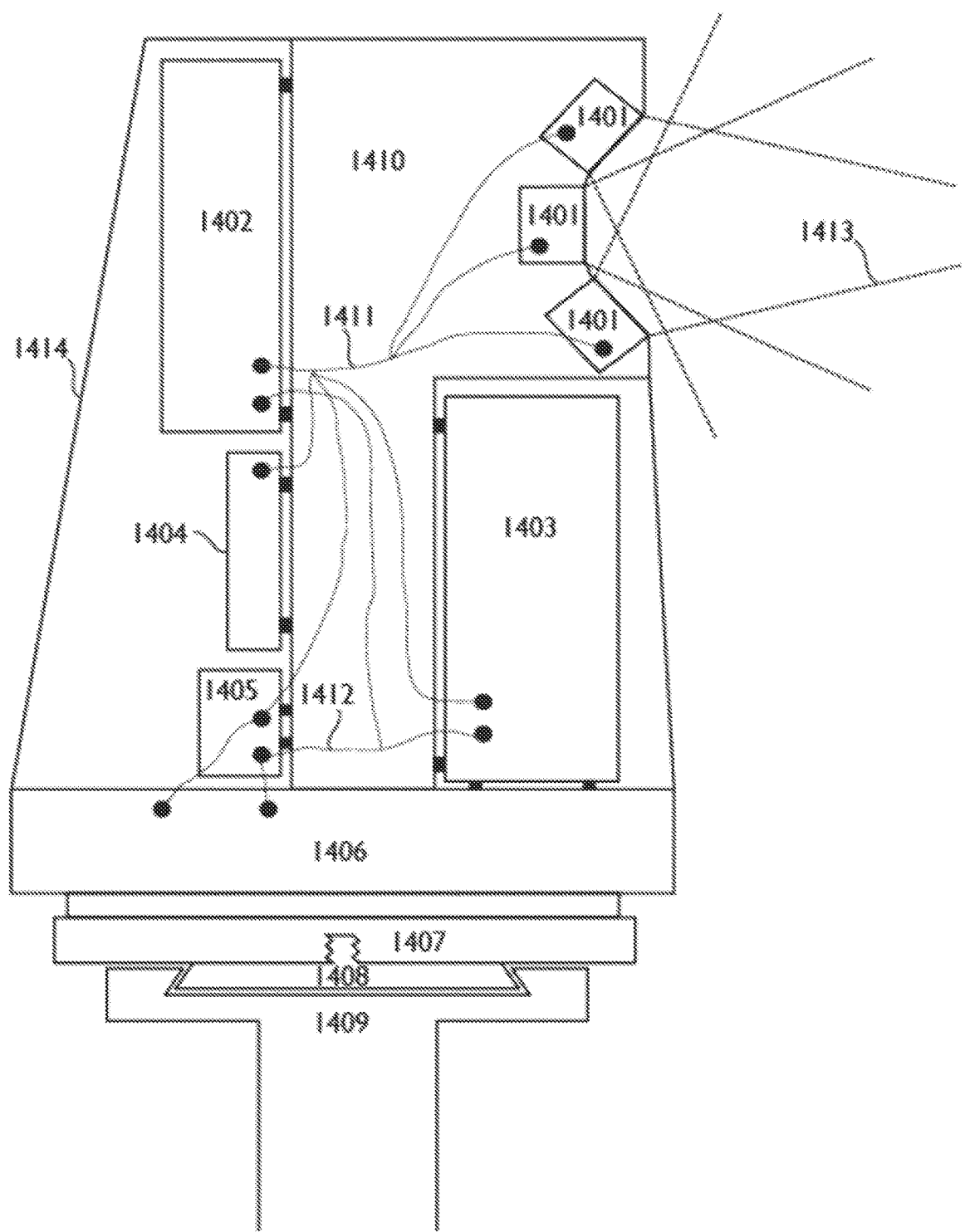
FIG. 14 illustrates an alternative physical configuration for capturing 3D data.

In various embodiments, multiple 3D capture devices may be arranged along the surface of an outward facing arc, an inward facing arc, or in another configuration. FIG. 7, for example, exemplifies an arrangement along the surface of an outward facing arc. FIG. 14, for example, exemplifies an arrangement along the surface of an inward facing arc. The 3D capture devices may be arranged such that their fields of view overlap for a particular range of distances. The 3D capture devices may be arranged such that they provide a 360 degree panoramic view or full hemispheric view. This may be achieved, for example, by implementing an arrangement wherein devices are pointed outward from a central point at evenly spaced angles through a full circle.

In one or more embodiments, the one or more 3D capture devices may contain, be contained within, or be connected to onboard computing, power, and/or wired or wireless communication systems. The onboard computing may be used to provide initial processing or merging of 3D data, control of the 3D capture devices, and relaying of data received from the 3D capture devices to a remote computing device via a communication system. An onboard power system such as a battery may power the 3D capture devices, computing system, and communication system.

In those embodiments having the mobile computing device physically separated from the 3D capture devices, the mobile computing device may be attached to the body of a user such that the device need not be held by hand. Attachment methods include, but are not limited to, wrist straps, belt clips, and augmented reality displays such as Google Glasses that function as eyewear or other means for implementing a personal augmented reality environment.

Gathering Auxiliary Data During the Capture Process

The 3D reconstruction system may also include additional environmental sensors. Examples of such sensors include, but are not limited to:

Wireless equipment for measuring signal strength, noise, or other characteristics of various wireless frequencies, including but not limited to various WiFi bands, WiMax, cellular networks, and radio and TV broadcast frequencies;
Radiation detection equipment;
Temperature, humidity, wind, air pollutant, and/or pollen detectors;
Ambient light measurement systems;
Ambient noise measurement systems;
Microphones, directional microphones, and array microphones;
Absolute distance measurement systems such as laser and ultrasonic rangefinders; these systems may be used to improve the accuracy of alignments at ranges for which the primary 3D capture device has limited or no distance measurement capability;
Cameras that detect outside the visible spectrum, including thermal infrared cameras, near-infrared cameras, and ultraviolet cameras;
Cameras that detect inside the visible spectrum; while the 3D capture device may contain visible-light cameras, an additional camera may be used to capture information at better quality (e.g., higher resolution, greater field of view, better image fidelity, high dynamic range, higher temporal frequency, or some other characteristic).

Data from these additional sensors may be recorded with a timestamp or along with particular captures by the 3D capture device thereby allowing sensor data to be associated with particular positions of the 3D capture hardware. When a particular 3D capture is aligned to other 3D captures, the position of data from additional sensors captured at the same or very similar time may be determined by using the aligned position of the 3D capture device when it took that particular 3D capture. This data from additional sensors may be collected over time to create a 2D or 3D map of additional sensor readings. The user interface on the 3D reconstruction system may allow the user to view this map as it is being generated or after completion. This map may then be superimposed onto the 3D reconstruction of an object or environment with the positions of the datasets aligned in a common space.

Additional cameras correlated to the capture of image data inside or outside the visible spectrum may be calibrated to the 3D capture device such that data from the external camera may be accurately mapped onto the 3D reconstructions created by the 3D reconstruction system. This calibration may happen prior to the 3D capture process—for example, at time of manufacture or prior to each use—and may be preserved by means of a rigid physical coupling between the camera and 3D capture device. Pre-calibration may be accomplished with the use of a calibration target that can be sensed by both the 3D capture device and the additional camera thereby allowing the system to establish multiple point correspondences between data captured by the 3D capture device and the additional camera.

Calibration may also be accomplished during or after the 3D capture process by use of comparing visual and/or depth features such as keypoints, corners, and edges between the 3D capture device and the additional camera. Such a calibration technique derives a most likely transformation between 3D capture device position and orientation and additional camera position and orientation. This calibration may vary over time due to changes in temperature or other factors, but calibration estimates from different times may be used to create an accurate estimate for the calibration at any given time. Once the calibration is established, data from these additional cameras may be used to build up 3D models.

User Interface Options

A graphical user interface may be used during or after the capture process to provide feedback to the user. The graphical user interface may serve various purposes in completing a scan. Such uses include allowing the user to better aim the 3D capture device over a desired area, monitor what has thus far been captured and aligned, look for potential alignment errors, assess scan quality, plan what areas to scan next, and to otherwise complete the scan.

Figure 2:
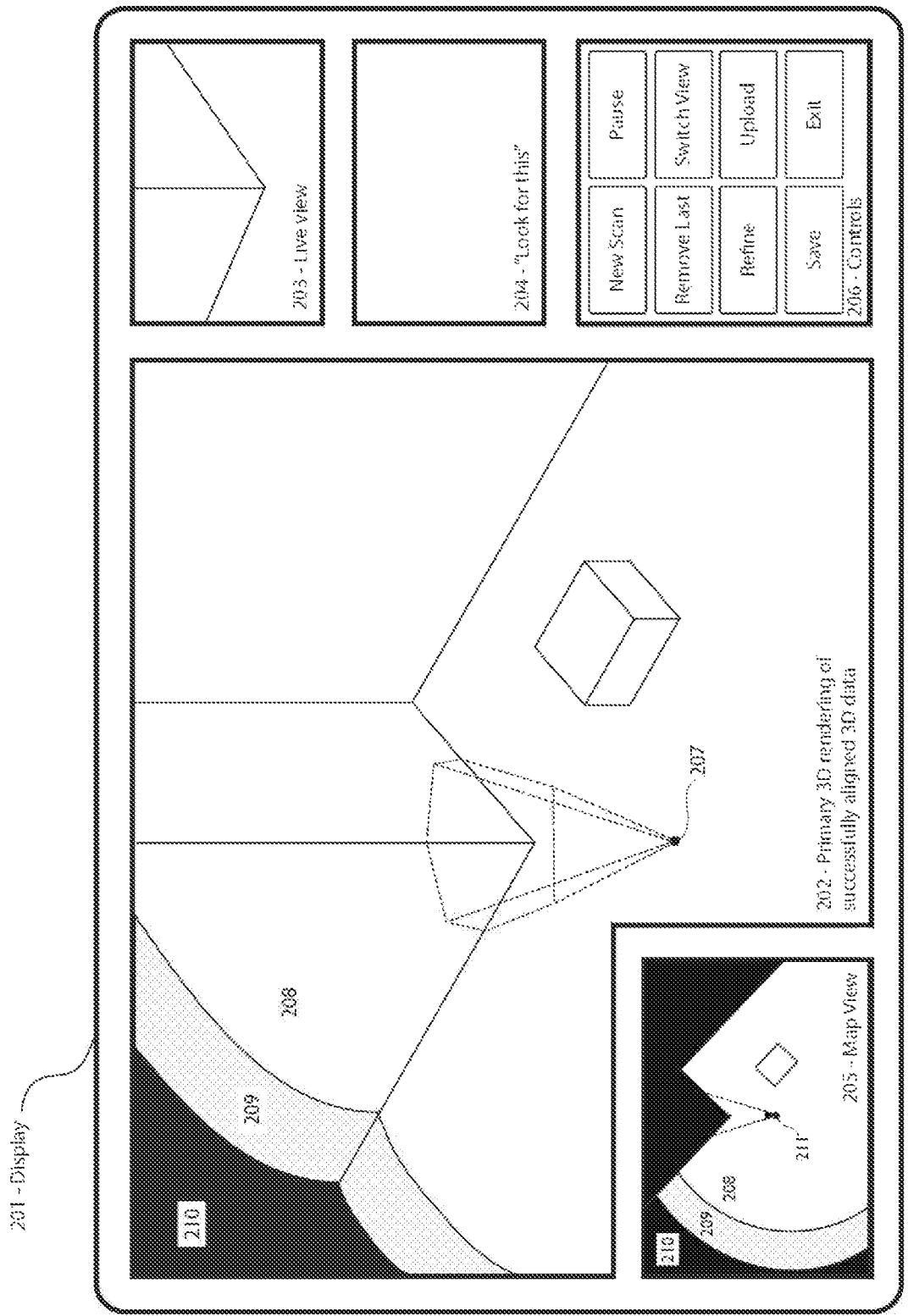
FIG. 2 illustrates a user interface for capturing 3D data.

The user interface may contain various windows with different views of the capture process. One embodiment of a graphical user interface is shown in FIG. 2. While certain user interface embodiments and implementations are discussed herein. it should be noted that a wide variety of physical arrangements for the various data displays is possible. Data displays may be brought up as overlays instead of separate spaces and, in some instances, certain data displays or incidents of data may be omitted.

A "live" view 203 that shows distance and/or color data as may be currently seen by a 3D capture device may be implemented in the course of the present invention. Such an implementation may show a live video feed from a color camera that is part of the 3D capture device. Such an implementation may also show colored distance data with the color data removed or highlighted in areas where corresponding distance data is unavailable.

A "look for this" view 204 that shows 2D or 3D data from a known area may also be implemented within the scope of various embodiments of the present invention. Such a view might encourage the user to point the 3D capture device at a particular area. This may be used in the case where the 3D alignment system has lost track of the position of the 3D capture device or said device cannot align current or recent 3D capture information with the existing aligned 3D data. A correctly aligned area—such as one that is near the probable current location and point of view of the 3D capture device—may be shown. This area may continue to be shown until the 3D alignment system is able to determine the current location and orientation of the 3D capture device. The "look for this" view 204 may alternatively be used to show a hole, unscanned area, or area that has not been scanned at sufficient quality or fidelity.

In yet another option, the "look for this" directive may be provided via audio instructions. The user may be directed to move or rotate the 3D capture hardware in a particular direction. If the current 3D scene alignment is known, instructions (e.g., "down," "turn left," and the like) may be emitted to guide the user from the current position and orientation to a desired position and orientation.

If the current 3D scene cannot be matched to existing aligned 3D data, then recent optical flow, accelerometer, inertial measurement unit, or other data may be used to estimate how the user should backtrack in order to bring the 3D capture hardware closer to the last known-aligned position and orientation. The existing aligned 3D data may also be analyzed by an object-recognition algorithm to identify objects and their attributes. This data may then be used to direct the user. For example, a user could be told to position the 3D capture hardware at or near part of an object or objects (e.g., "point the sensor at the back of the red couch").

A primary 3D rendering 202 of successfully aligned captured 3D data 208 may also be shown. The display of this data allows the user to see what areas have thus far been captured. The point of view of this 3D rendering 202 may be chosen to provide a view of the most recent successfully aligned capture as well as the surrounding area. For example, the point of view may be chosen to be at a position at a specific distance behind the aligned position of the 3D capture device at the most recent capture and at an orientation that matches the aligned orientation of the 3D capture device at that time. The near clipping plane of this point of view may be set to remove 3D data that is between the position of the point of view and the aligned position of the 3D capture device. The point of view may also be chosen to match the position and orientation of the most recently aligned position and orientation of the 3D capture device but have a wider field of view.

The point of view may also be user-controlled thereby allowing the user to use touch, mouse, or keyboard input to change the point of view to browse various parts of the aligned captured 3D data. For example, in a touch interface, a drag by a single finger may be used to rotate the 3D data. A pinch and spreading of two fingers may be used to zoom out and zoom in, respectively. A drag by two fingers may be used to move the viewpoint along the surface of a horizontal plane.

The data 208 shown in 3D rendering 202 may include sets of points captured at various times by the 3D capture device with the different sets aligned into a common coordinate system for display. This 3D rendering may take the form of a point cloud, 3D mesh, volumetric rendering, surfel cloud, cartoon rendering, or other format.

The displayed 3D data may be highlighted in various ways. Examples include:

Areas for which there is no captured data may be noted via a specific background 210.

3D data from the most recent capture (or captures) may be displayed differently so as to allow the user to distinguish it from older captured 3D data. Additionally, the points that comprise the most recent capture or captures may be displayed as thicker. Alternatively, the boundaries of the most recently captured region may be highlighted. In another alternative, the boundaries of the field of view 207 of the 3D capture hardware when capturing the most recently captured region may be shown; this may take the form of a wireframe of a pyramid, with the apex of the pyramid at the point of capture.

Captured 3D data for which there is high confidence in the accuracy of the position may be displayed differently from captured 3D data for which there is low confidence. Data could be color-coded based on confidence, or low-confidence areas may be displayed with smaller points, checker-boarded, grayed out, covered with X marks, or otherwise indicated to be different.

Data from an external sensor used during the capture process may be used to color the 3D data. For example, a thermal infrared camera may be calibrated to the 3D capture device, allowing the depth data captured to be labeled with temperature data. As another example, auxiliary data about spatial variations in WiFi signal strength may be overlaid as a color-coded cloud of points.

Captured 3D data may be converted to a mesh representation, and the mesh may be displayed as a wireframe or single color with lighting. This may allow auxiliary data to be shown more clearly.

Depth edges or depth discontinuities in the captured 3D data may be highlighted; for example, thick black lines may be added along depth discontinuities.

Locations for which 3D data is expected but no sensor data is available may be highlighted. For example, a hole detection algorithm, such as that described in U.S. provisional patent application No. 61/502,427 and subsequently filed U.S. patent application Ser. No. 13/539, 252 may be used to seek out holes in the thus far scanned data. Once holes are identified, they may be visually displayed in various ways, for example by creating a polygon mesh to span the hole and then displaying that mesh tagged with a particular color. In one embodiment, holes that span space that is known to be empty based on sensor data are not displayed. Additionally, the areas around the boundary of what has been captured so far may be displayed; known surfaces may be extended by a specified distance based extrapolations using the normal vector and potentially curvature of the surface detected near the boundary line. This extended surface 209 may be displayed as a specially colored polygonal mesh or other surface representation. This coloring may be used to distinguish it from areas for which no data is known or expected 210.

Positions and potentially orientations of the capture locations of previously captured 3D scenes that comprise the 3D data captured so far may be displayed. These may be shown as spheres, pyramids oriented to show the field of view at the time, or other visual representations. They may be selected by the user for various purposes such as visually hiding/showing their data, removal, realignment, and other purposes.

Aligned 3D data that significantly conflicts with other aligned 3D data may be specially highlighted. Such data may be detected by low alignment score or by its presence inside a volume that is known to be empty based on other aligned 3D data. The conflicting data may be clustered via a spatial clustering algorithm such that it can be selected and deleted manually.

Toggle buttons or other controls may be present inside or outside the space of 3D rendering 202 in order to control options for highlighting or rendering of displayed 3D data.

In the case that the 3D reconstruction system is unable to align a new captured 3D scene in a timely manner, the system may prompt the user to select a location, area, or previous capture position on the primary view 202 or map view 205 to indicate an area close to where the 3D scene has been captured. This information may be used by the 3D reconstruction system to change or restrict the search space of possible alignments.

The primary view 202 may also allow users to select specific locations on the 3D data to add additional information. This user action may be accomplished in various ways, for example by tapping on that location, and then selecting a type of action desired from a pop-up menu. Alternatively, the action may be accomplished by tapping an on-screen button to select the type of action followed by tapping on one or more specific location on the 3D data to select locations. Types of actions include:

Annotating a specific location with text, image, or other data.

Identifying the boundaries of a shiny object such as a mirror or a transparent object such as a window. This information may be used to alter the 3D data, for example by throwing out data that was sensed through the boundaries of the region labeled as mirror.

Selecting a location to remove surrounding data that has been detected to be inconsistent.

The "look for this" functionality may also be accomplished by reorienting the 3D rendering 202 to the viewpoint and data that the user is being directed to capture.

A high-level map view 205 may be provided in order to give users a larger context for their position. This map view 205 may be displayed from various perspectives. For example, the map view 205 may be 2D; the 3D data captured so far (or some subset thereof) may be projected onto a flat plane in order to create a 2D image. Alternately, the map view 205 may be an isometric, orthographic, or perspective 3D view of the 3D data captured so far (or some subset thereof). In one embodiment, the 3D view is rendered from above, providing a top-down view of the data. This 3D data may be displayed in a variety of ways; the list of methods of displaying the 3D data and the types of highlighting that can be applied to the data as described for the primary 3D rendering 202 all apply to the map view 205 as well, and may be used in combination, in conjunction, or in parallel. In addition, the current or most recently known location 211 of the 3D capture device, the direction it is pointing, and/or its field of view may all be displayed in the map view 205.

The user interface may also contain a set of controls 206 for the scan process. These controls 206 may include buttons or other control surfaces for actions such as:

Removing the most recent scan or scans from the aligned 3D data;
Deleting all the scan data so far and starting over;
Saving the results of the alignment so far;
Pausing or resuming the alignment process;
Running a non-realtime process to improve the alignment;
Uploading the scan data to a remote server for storage or further processing;
Exiting the scan program;
Toggling between different rendering options for the 3D view or 3D map view;
Toggling between different types of data display or highlighting for the 3D view or 3D map view;
Entering a mode in which the user may mark a specific object or location in the aligned 3D data and/or adding a spatially situated data label.

Robotic Mapping

The 3D capture hardware may be attached or coupled (either permanently or detachably) to any one of a variety of types of robots or other mechanized implementation rather than be manipulated by a human user. Possible implementations include, but are by no means limited to:

The 3D capture hardware is placed at the tip of a robotic arm on a fixed platform.

The 3D capture hardware is placed at the tip of a robotic arm on a moving platform or vehicle.

The 3D capture hardware is mounted to a fixed point on a moving platform or vehicle.

The 3D capture hardware is mounted to an aerial drone such as a quadcopter.

The 3D capture hardware is mounted at a fixed location, but the object being scanned is rotated on a turntable.

If the position and orientation of the 3D scanner are being controlled by processor based execution of an algorithm stored in memory instead of human motion, a path for the movement of the 3D capture hardware to capture desired 3D data can be generated based on edges and holes in existing data. Numerous algorithms may be implemented for planning the mapping process, including but not limited to simultaneous localization and mapping (SLAM) algorithms. When a new area is being scanned automatically, the robot or other mechanized implementation may rotate the 3D capture hardware through a variety of orientations designed to cover a full 360 degree view of its surroundings. The robot or mechanized implementation may move closer to areas that have been scanned with low quality or are close to the maximum range limit of the 3D capture hardware in order to obtain more or better data. A hole-filling process, such as that described in U.S. provisional patent application No. 61/502,427 and subsequently filed U.S. patent application Ser. No. 13/539,252 may be used to seek out holes in the scanned data. The aforementioned techniques may then be used to generate an image to show the user or to instruct the robot or mechanized implementation what to scan in order to fill a hole. Alternately, the 3D capture process may physically be done by a robot, but controlled remotely by a human via a telepresence interface.

Addressing the Problem of Drift During the Alignment of 3D Scenes

While captured 3D scenes that are being aligned together can usually be aligned based on pair-wise overlaps, it is not common for every 3D scene to overlap every other 3D scene. As a result, some 3D scenes may be a large number of steps away from other 3D scenes in a graph of scene overlaps. If there is some potential for error in each pair-wise alignment, the potential error in alignment between two 3D scenes that are far from one another in a graph of pair-wise alignments may be significant. Thus, the potential for alignment drift in an alignment of a large number of 3D scenes may become increasingly significant. The problem may be exacerbated if the maximum range of the 3D capture hardware is limited or if its accuracy decreases with distance. There are several potential methods of addressing this issue of "drift." Thus, an alignment process, such as that described in U.S. provisional patent application No. 61/502,427 and subsequently filed U.S. patent application Ser. No. 13/539,252, may be aided by the following methods.

Global alignment processes may be utilized. In such a process, multiple potentially overlapping 3D scenes may be connected to one another in a graph. Mutual alignment may be improved via a graph optimization process.

In another method, reference markers may be used. The relative location of a network of markers may be determined via the use of surveying gear or other instruments. The markers can be made to be automatically detected and identified by a vision algorithm utilizing the lines of QR codes, labels with a unique shape (potentially with uniquely identifying visual information), or reference spheres (potentially with uniquely identifying visual information). When these markers are detected in captured 3D scenes, their positions may be used to apply additional constraints when performing global alignment.

In yet another method, reference measurements may be used. For example, a user may enter the distance between a pair of parallel walls, and this distance may be used as a constraint to improve global alignment. This may be accomplished, for example, by adding a constraint that all 3D scenes containing one of these walls remain a fixed distance along a particular axis from all 3D scenes containing the other wall.

In a still further method, straight lines may be created by stretching a string between two points. The line may be identified in 3D scenes by use of a computer vision algorithm. For example, a color filter may be used to isolate captured 3D data of a color corresponding to the line, and a Hough transform may be used to identify the position of any lines in this isolated data. Once any segments of the line are identified, the alignment algorithm may use the known straightness of this to apply an alignment constraint when aligning multiple point clouds containing the line.

The alignment constraints mentioned herein may be soft. For example, the constraints may be enforced by an error function that penalizes 3D scene positions and orientations that violate the constraints. The penalty may be dependent on the amount of deviation from the constraints. This error function may be used in conjunction with other error functions in order to determine the quality of alignments during a pair-wise or global alignment process. Alternatively, the alignment constraints may be hard. For example, the reference measurements or other alignment constraints may be used to force specific 3D scenes to maintain a particular relative or absolute position or orientation on one or more axes.

Absolute position data may be obtained from remote emitters in another methodology. Emitters corresponding to the global positioning system (GPS), cell tower positions, WiFi network hotspots, ultrasound emitters, or other remote devices may be used to constrain absolute position and/or orientation of captured 3D data. These soft constraints could then be used to more precisely align 3D scenes within a common global reference frame.

2D image data or 3D data with limited depth information may also be used to reduce drift. Many types of 3D capture hardware may have limited to no depth detection ability for objects at certain distances. These device may still capture visual information about objects at these distances. In addition, the 3D capture hardware may be augmented with a calibrated 2D camera capable of capturing images. Since the 2D image data is not limited by range, 3D scenes that are too far from each other for 3D alignment to be useful may be aligned via this 2D image data or 3D data with limited depth information. Directly aligning such distant scenes may substantially reduce drift over long distances relative to a method that solely uses a limited-range alignment process based solely on 3D data.

Figure 10:
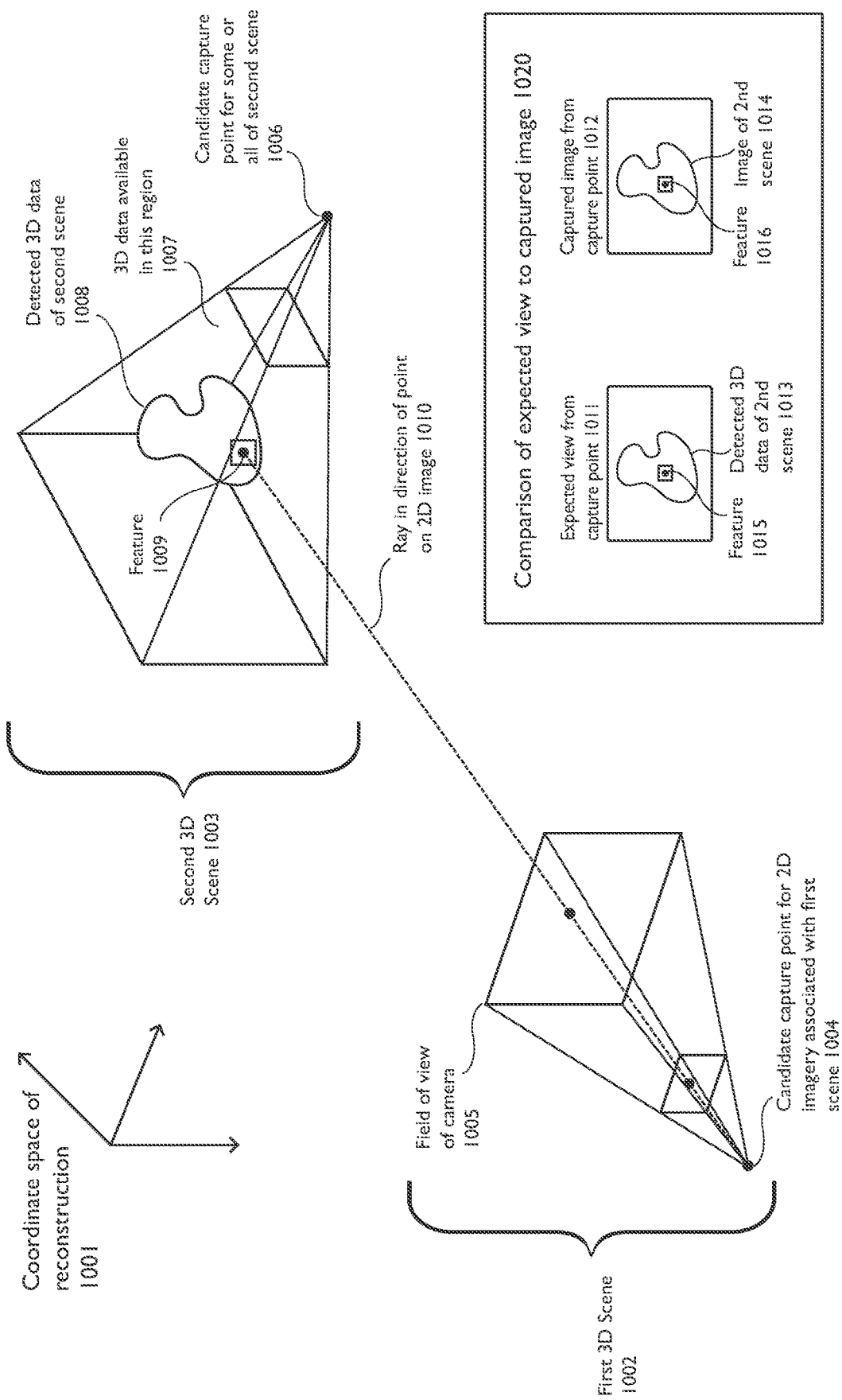
FIG. 10 illustrates the supplemental use of 2D information in a 3D scene alignment process.

FIG. 10 shows an exemplary use of 2D image data or 3D data with limited depth information in the alignment process. In FIG. 10, a first scene 1002 is aligned to one or more second scenes 1003 in common coordinate space 1001. A 2D image of the physical world has been captured or generated as part of the first 3D scene, and an alignment process has generated a candidate position and orientation for the candidate capture point 1004 of this image. The field of view 1005 of this 2D image is shown. One or more second scenes, one of which is shown as second scene 1003 with candidate capture position and orientation 1006 and field of view with region containing 3D data 1007, may contain detected 3D data 1008.

The visual information from the 3D capture hardware and/or calibrated 2D camera, such as color information, may be used to create visual features 1009. These visual features 1009 may include corners, edges, textures, areas of a particular color, recognized objects, or other features. A variety of feature detection methods (e.g., FAST) may be used to find these features, and a variety of feature descriptors (e.g., SIFT or SURF) may be used to encode said features. An orientation-independent encoding may be used to ensure that the features can be matched to views of these features from different angles. The features may be at a location for which concurrent 3D capture data is unknown. Thus, the position of said features in space may be unknown and they may exist at any one of a range of distances along a particular line 1010 from the 3D capture device or 2D camera.

This information can be used to help the process of aligning 3D scenes to determine the correct position and orientation for first scene 1002 in common coordinate space 1001. The expected view 1011 from the perspective of the 2D camera in the first scene 1002 may be compared against the actual view 1012 from the perspective of the 2D camera in the first scene in comparison 1020. The expected view 1011 may show a representation of 3D data 1013 from the second scene 1003, and feature 1015 may be detected. The actual view 1012 may contain 2D imagery of 3D data 1014 from second scene 1003, and feature 1016 may be detected. The comparison of expected 1013 versus actual 1014 imagery or the position and/or characteristics of expected 1015 versus actual 1016 features may be part of the scoring process for the alignment of the first scene 1002 to the one or more second scenes 1003.

During the scoring of possible alignments, the score or error function for an alignment of first 3D scene 1002 to one or more second scenes 1003 may be affected by how well the features generated from the first scene line up with potentially corresponding 2D or 3D features in other scenes in the second aligned group of 3D scenes. This scoring or error function can happen in a variety of ways. For example, when assessing a potential alignment between a first 3D scene 1002 and a second group of one or more 3D scenes 1003 that are aligned to one another, the positions of the features 1016 found in the first 3D scene 1002 may be compared to the expected positions of features 1015 from the second group of 3D scenes 1003 as they would be visible from the point of view 1004 that captured the first 3D scene based on the potential alignment. A good correspondence between the positions of features 1015 in the first 3D scene and the expected positions of some similar features 1016 from the second 3D scene group may indicate an increased likelihood of a good alignment. Since this 2D correspondence may be able to happen over a greater range than 3D correspondence, it may allow distant 3D scenes to come into tighter alignment with one another. The assessment of alignment quality between a first 3D scene 1002 and one or more second 3D scenes 1003 via detected features and/or other 2D information may happen in a variety of ways.

Figure 9:
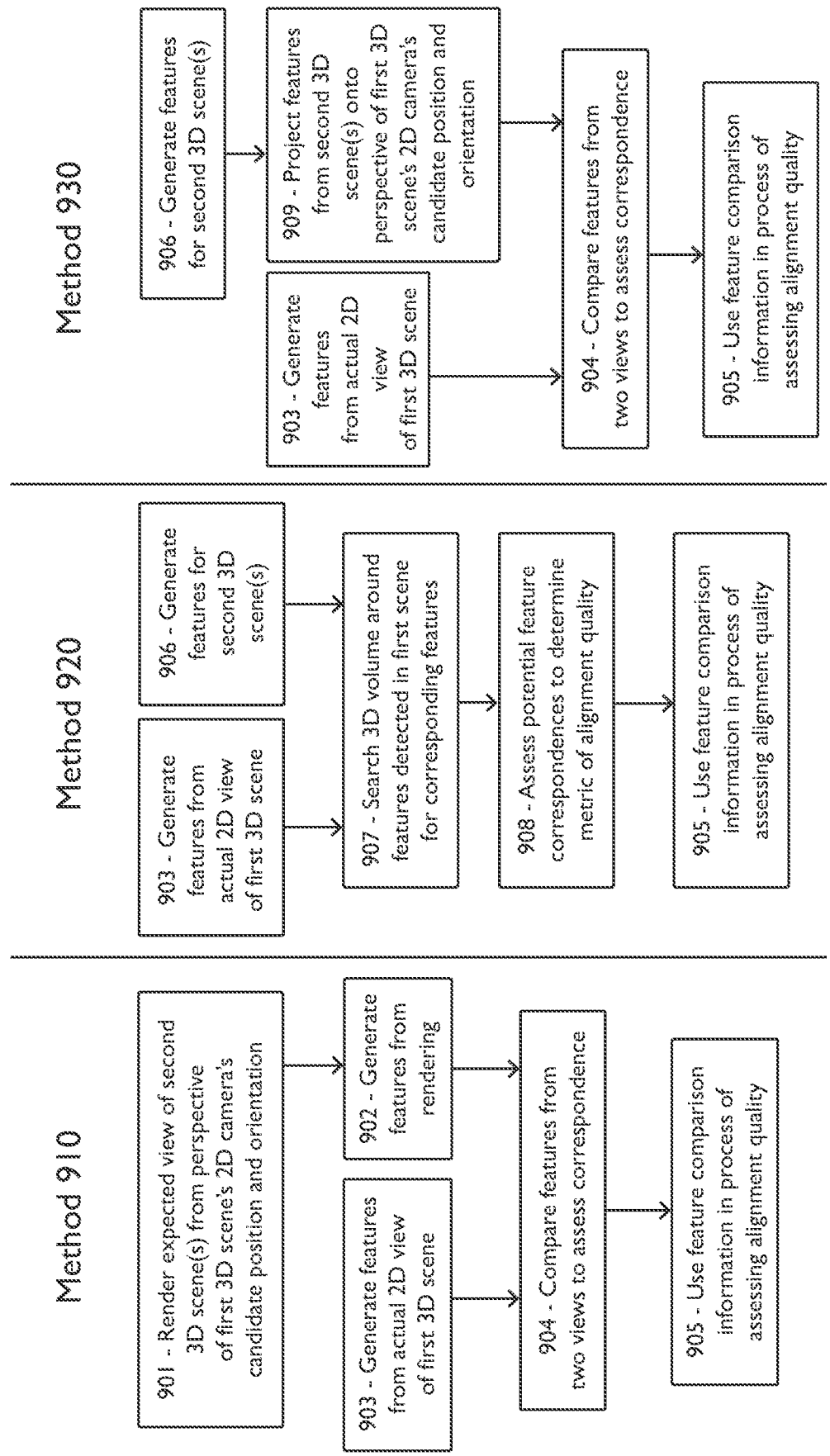
FIG. 9 illustrates various methods of assessing alignment using 2D information.

FIG. 9 illustrates examples of possible methods—910, 920, and 930—for assessing alignment quality.

The methodology of method 910 begins with step 901 in which the expected view of the second scene(s) 1003 is rendered from the perspective of the candidate position and orientation of the 2D camera of the first 3D scene (1002). This rendering may be accomplished in a variety of ways. For example, points, 3D meshes, surfels, or other representations of 3D data from the second scene(s) 1003 may be loaded onto a graphic processing unit (GPU) for rendering to a viewpoint at candidate position and orientation 1004 on shared coordinate space 1001. The resulting 3D rendered image may then be taken from the buffer for further processing. Locations on the 3D rendered image for which there is no data may be specially marked.

In step 902, the 3D rendering of the data from second scene(s) 1003 is processed to generate features. A wide variety of feature types as well as feature detection and feature descriptor generation techniques may be utilized and are known to one of ordinary skill in the art. In step 903, the 2D image from the first scene 1002 is processed to generate features. A wide variety of feature types as well as feature detection and feature descriptor generation techniques are known and may be utilized in implementing the presently disclosed invention.

In step 904, the features derived from the first scene 1002 and the features derived from second scene(s) 1003 are compared in order to assess the correctness of the candidate alignment. A wide variety of methods exist for doing the comparison. As one example, pairs of features, one from each of the 2D images, whose descriptors vary by less than a certain amount according to a particular norm in feature space and whose positions on the two 2D images differ by less than a certain distance may be considered to be similar feature pairs. The number of similar feature pairs could form a metric of alignment quality whereby greater numbers of closely aligned feature pairs indicate a better alignment. Alignment and similarity metrics may be continuous; the quality of a feature pair may be inversely proportional to their distance from one another on the 2D images and inversely proportional to distance in feature space thereby creating a continuous quality score for any feature pair.

Mismatched feature pairs may also be detected. A mismatched feature pair may consist of a pair of features, one from each of the 2D images, for which the physical distance between the features on the 2D images is below a particular threshold but the distance between their feature descriptors in feature space is above a particular threshold. Mismatched feature pairs may indicate poor alignment and thus their presence may be factored into a metric of alignment quality. Mismatched feature pairs may be ignored in the metric of alignment quality if there is a nearby similar feature pair. Thus, a metric of alignment quality may include summing positive scores from similar feature pairs and negative scores from mismatched feature pairs. The 3D data from the first scene 1002 may be used to mask out areas of the 2D image of the first scene 1002 for which the 3D data from the first scene 1002 obscures the 3D data from the second scene(s) 1003. The features in these areas may be expected to be mismatched since they are views of different 3D data.

In one or more embodiments described herein, possible corrections to the alignment may be generated by analyzing the vectors of differences in physical position on the two images: one of the 2D image of the first scene 1002 and the other of the 3D rendering of the data from the second scene(s) 1003. For example, a correction to the orientation of candidate capture point 1004 could be generated by repeatedly running a 2D Iterative Closest Points algorithm until the distance between identical features is minimized. The necessary orientation change may then be derived to achieve this best-fit.

In step 905, a metric of alignment quality derived from feature comparisons is used in the overall assessment of the alignment of the first 3D scene 1002 to other 3D scenes including scene(s) 1003. The 3D-based alignment and scoring techniques described or otherwise referenced herein provide additional indications of alignment quality.

Method 920 is another method for assessing alignment quality. This method involves, at step 903, processing the 2D image from the first scene 1002 to generate features as described herein. Separately, in step 906 features are generated on the 3D data from second 3D scenes 1003. Since these features may be generated directly from 3D data instead of from 2D images and thus may be viewed from a variety of angles during the comparison, it is preferable to use an orientation-independent feature descriptor such as SIFT.

In order to run a feature descriptor on 3D data, the 3D data from second 3D scene 1003 may be processed to form a textured 3D mesh which can then be analyzed as a 2D surface that can be approximated to be locally flat when detecting and generating features. A feature detector and descriptor may be run on the 2D image(s) from the position of one or more 2D camera positions used to generate the data for the second 3D scene(s) 1003. In this case, these features could then be placed into common coordinate system 1001 using the distance data from the 3D capture hardware used to gather the data for the second 3D scene(s) 1003.

The features generated in step 906 may be stored in a 3D data structure such as an octree for efficient searching by position. This feature generation step may be run incrementally; for example, every time a new 3D scene is aligned to the group of aligned 3D scenes, its features may be detected and added to a shared data structure of features. Duplicate or near-duplicate features may be removed.

In step 907, the areas around the features detected from the 2D view of the first scene 1002 are searched for nearby features from the second 3D scene(s) 1003. Since a feature from the first scene 1002 may have limited or no distance information, a volume along the ray from the candidate capture point 1004 in the direction of the feature from the first scene 1002 may be searched in the data structure containing features from the second 3D scene(s) 1003. This volume may take the form of a conic section or pyramid section with the central axis along the aforementioned ray.

The minimum and maximum distance along the ray of the boundaries of the search volume may be determined using factors such as any distance information (however limited) known about the feature from the first scene 1002 or whether no distance information was detected at that location (which may imply it is outside the distance sensor's maximum range). The maximum distance along the ray of the search volume may also be limited based on the intersection or near intersection of the ray with captured 3D data from second scene; data more than a small distance beyond this point of intersection may be occluded and may thus be excluded from the search volume.

The volume may be broken up into components. For example, an approximation to the volume formed using a group of cubes may be utilized for faster querying of the data structure containing features from the second 3D scene(s) 1003. One or more potentially corresponding features from the second 3D scene(s) 1003 may be found inside the search volume. Some of these features from the second 3D scene(s) 1003 may be discarded due to known occlusions; for example, features that are more than a particular distance beyond the feature that is closest to candidate capture point 1004 may be discarded. Information about any features from the second 3D scene(s) 1003 that fall within the search volume for a feature from the first 3D scene 1002 may be used to establish potential feature correspondences.

In step 908, the potential feature correspondences are assessed to determine a metric of alignment quality. The techniques for determining similar and mismatched feature pairs as well as the use of these feature pairs in coming up with a metric of alignment quality as discussed in step 904 may be applied in this step as well.

In step 905, a metric of alignment quality derived from feature comparisons is used in the overall assessment of the alignment of the first 3D scene 1002 to other 3D scenes including scene(s) 1003.

Method 930 illustrates a further methodology for assessing alignment quality. This method involves step 903, processing the 2D image from the first scene 1002 to generate features as described herein. This method also involves step 906, in which features are generated on the 3D data from second 3D scene(s) 1003.

In step 909, detected features from second 3D scene(s) 1003 are projected onto the 2D plane corresponding to the field of view of the 2D camera with candidate orientation and capture point 1004. Some of these features may be removed as likely or known to be occluded from the position 1004. For example, any first feature that is within a specified radius (as measured on the 2D plane) of a second feature that is more than a certain distance closer to position 1004 than the first feature may be removed. A reduced fidelity representation of 3D data from second 3D scene(s) 1003 may be generated in various ways, for example by marking the presence of 3D data from the second scene in voxels of a voxel grid of limited spatial resolution.

Alternately, 3D data representing the position of 3D data from second 3D scene(s) 1003 at some level of fidelity may also be projected onto the same 2D plane, and features more than a specific distance beyond the distance of this 3D data may be removed. The data structure of features from second 3D scene(s) 1003 may be queried in a specific volume. For example, the pyramid formed by the field of view of the 2D camera at candidate capture point 1004 may be used as the boundary for the search volume in the data structure.

In step 904, the features derived from the first scene 1002 and the features derived from second scene(s) 1003 are compared in order to assess the correctness of the candidate alignment as described herein.

In step 905, a metric of alignment quality derived from feature comparisons is used in the overall assessment of the alignment of the first 3D scene 1002 to other 3D scenes including scene(s) 1003.

The methods of assessing alignment using 2D information described herein are not exhaustive.

Additionally, the methods of assessing alignment using 2D information described herein may run interleaved, in parallel, or as part of the same optimization as the other alignment techniques described or otherwise referenced herein.

In another technique, assumptions about planes being flat and potentially perpendicular may be used to reduce the potential for drift. This can be useful in situations for which the environment being scanned is a man-made structure that is supposed to have flat floors, walls, or other surfaces. For example, one or more planes may be identified in a 3D scene during the capture process. Methods such as a random sample consensus (RANSAC) may be used to find large sets of points that are approximately coplanar in a 3D scene.

Once such planes are identified, their position and orientation may be used to define plane objects (e.g., a collection of information about a given plane). Additional information, such as 2D visual features, using SURF and SIFT for example, boundaries, edges, corners, adjacent planes, location and visual appearance of observed points, or other data may be recorded as part of the plane object. This additional information may be determined by projecting 3D scene data and other associated spatial data that is within a particular distance threshold of the plane onto the plane along the dimension of the normal vector to the plane. If multiple plane objects are close to a common architectural angle from each other in orientation (e.g. multiples of 45 degrees such as 0, 45, 90, or 180 degrees), their orientations may be altered slightly in order to get them to match up with the common architectural angle.

Methods such as RANSAC may be used to group plane objects with similar normal vectors. These groups may be used to bring the plane objects in the group into alignment with one another. These groups may be limited, however, based on spatial information. For example, the group may be composed of a network of plane objects for which connected pairs are within a specific distance of one another or overlapping.

Furthermore, energy minimization and other optimization methods may be used to alter orientations of many planes or groups of planes at once. The function to be optimized may include penalty terms for changes in the orientations or normal vectors of plane objects or the positions of points comprising the plane objects, as well as terms based on the angle between orientations or normals of pairs of plane objects. For example, these latter terms may be smaller if the angle between two plane object normals is close to a multiple of 45 degrees such as 0, 45, 90, or 180 degrees, and these terms may be regularized so that only small angular adjustments are preferred.

Examples of specific terms in the function may include the L1 or L2 norms, or squared L2 norm, of the angles or sines of the angles between the normal of a plane object before and after alteration, or of the vector difference between the normalized normal vectors before and after alteration, and the regularized L1 or L2 norms, or squared L2 norm, of the differences or sines of the differences between the angles between pairs of two different planes and the preferred angles that are multiples of 45 degrees such as 0, 45, 90, and 180.

An example of the former type of term is $|v-w|^2$ where v is the unit normal vector of the plane before alteration and w is the unit normal vector of the plane after alteration. Another example is $\sqrt{(|\sin^2(\theta)|)}$, where $\theta$ $\theta$ is the angle between normal vectors v, before, and w, after. An example of the latter type of term is |sine(4θ)|, where θ is the angle between the normals of the two plane objects. The latter term may be capped so that planes that are significantly far from an architectural angle such as a multiple of 45 degrees are not impacted. An example of such a term is min(|sin(4θ)|, 0.1).

Techniques for solving such an optimization problem may include, depending on the exact function chosen, quadratic programming, convex optimization, gradient descent, Levenberg-Marquardt, simulated annealing, Metropolis-Hastings, combinations of these, or closed-form. The result of such an optimization is a new choice of normal direction for each plane object. The optimization may also be set up to choose a rigid transform of each plane object, and also take into account considerations such as minimizing movement of points in the planes, and movement relative to other planes, boundaries, lines, and other considerations.

Figure 12:
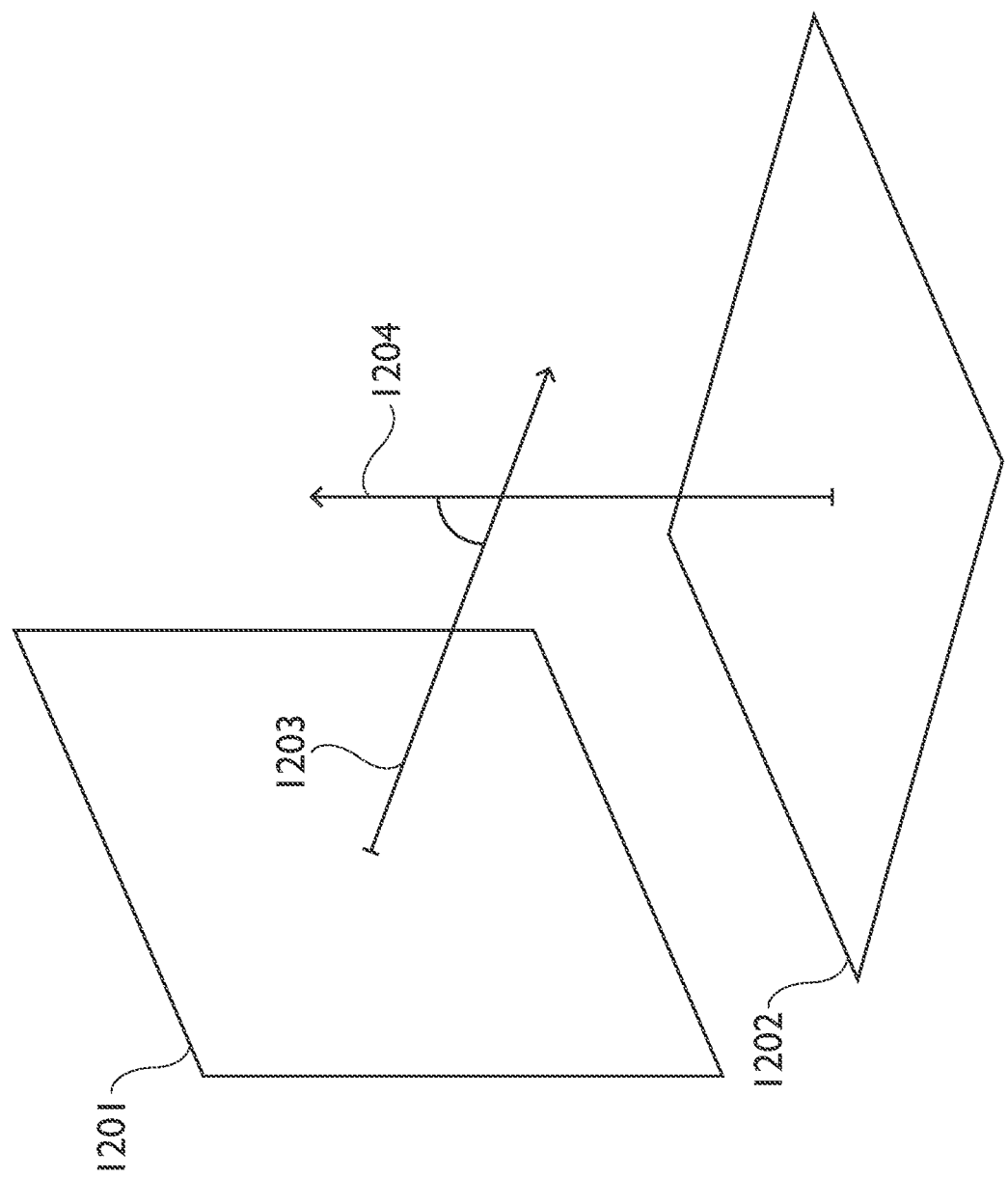
FIG. 12 illustrates the geometric aspects of aligning planes to known common architectural angles.

FIG. 12 shows two planes (1201, 1202) with normals (1203, 1204 respectively) which are close to 90 degrees from each other. In the formula below, vector $w_i$ represents the original normal vector of plane i, and $v_i$ represents the proposed new normal vector of plane i. Theta represents the angle between $v_1$ 1203 and $v_2$ 1204 in the diagram. The $v_i$ terms are simultaneously chosen in an attempt to minimize the sum over all terms in the energy function, including terms not shown in the diagram.

Examples of such terms are:

$$\min(|\sin(4\theta)|,0.1)+|v_1-w_1|^2+|v_2-w_2|^2$$

Information about plane objects may be used during the alignment process. For example, multiple 3D scenes with plane objects that appear to match visually and have very similar positions and orientations may be snapped together such that all of the similar plane objects become coplanar. Plane objects may be matched using 2D texture features such as SIFT or SURF, geometric descriptors such as known edges and corners, as well as position and orientation. Various methods such as the Iterative Closest Points algorithm may also be used to bring nearby plane objects into alignment via corresponding features.

How to move two or more plane objects so that they coincide may be determined by, for example, minimizing an energy function. Said function may be based on the correspondence of 2D features, edges, and corners, the distance each point on each plane has to move, the position of the two plane objects relative to other plane objects, edges, and features, and/or other considerations. This minimization may be performed via methods such as quadratic programming, convex optimization, gradient descent, Levenberg-Marquardt, simulated annealing, Metropolis-Hastings, Iterative Closest Points, or closed-form, where such methods are applicable to the chosen function.

Multiple plane objects that comprise part of a larger plane may be associated with a global plane object that defines a position and orientation for a given plane over multiple scans. If this position and orientation are enforced as alignment constraints, all 3D scenes containing portions of this plane may be constrained such that their plane objects associated with this global plane are made to be coplanar. Such constraints may be hard constraints, or may allow for slight alterations in the positions and orientations of the component planes within each scene. Plane objects which have been merged may be later split again. For example, a method such as RANSAC may be used to determine which plane objects should be considered part of a larger or global plane object.

As plane objects associated with particular scenes are adjusted using one or more of the techniques described throughout the course of this disclosure, the 3D data associated with these scenes may have the same adjustments applied thereto. This plane object optimization may run interleaved, in parallel, or as part of the same optimization as the other alignment techniques described or otherwise referenced throughout. One or more of the methods described may be used together to alter the positions of plane object, and the positions of 3D scenes relative to each other, and/or relative to a global coordinate system.

Figure 13:
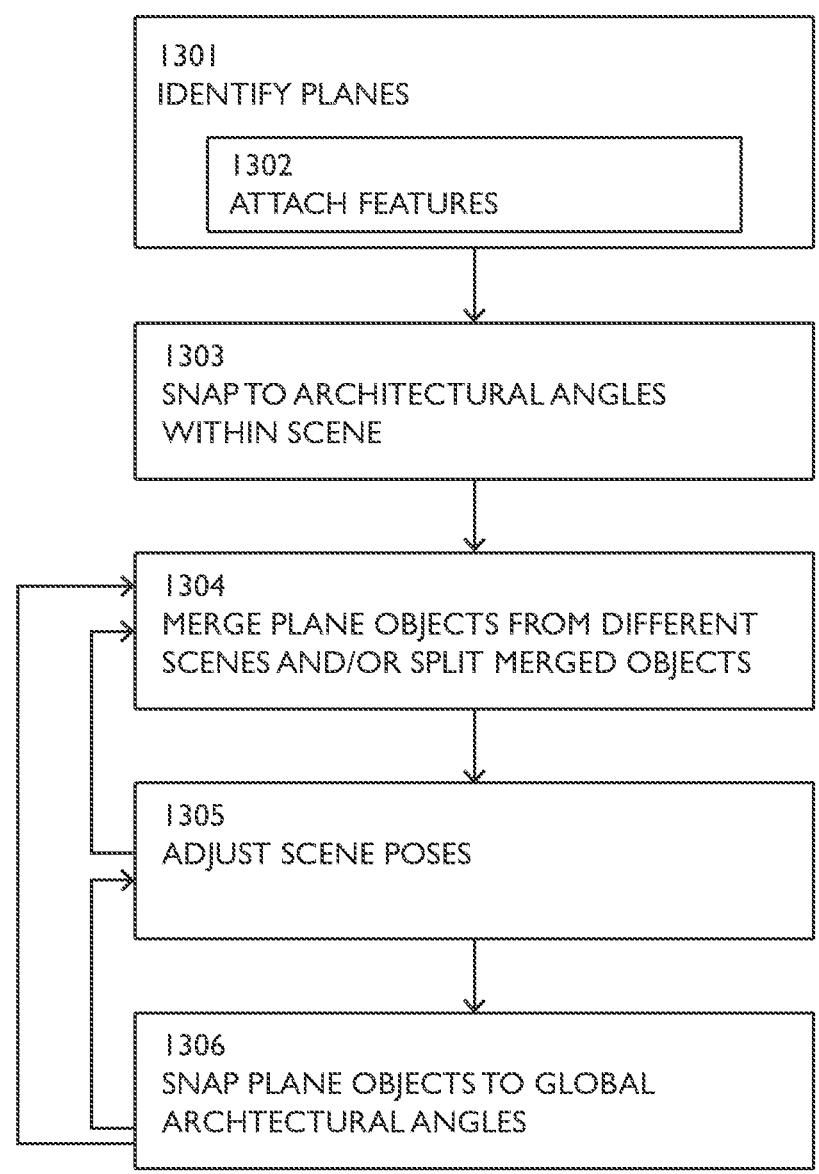
FIG. 13 illustrates a method of aligning 3D scenes by finding and examining the positions of planes.

FIG. 13 shows an example workflow for using plane objects to assist in aligning scenes. Plane objects are identified in 3D data at 1301 and associated 2D or 3D features may be optionally attached at 1302. For example, planes may be identified by multiple applications of RANSAC on 3D points in the scene which are not already assigned to a plane object. Optionally, for each plane object, the 3D points along with color and any texture information from images projected onto this plane may be used to generate 2D texture features using SURF and SIFT methods. Boundaries and corners of the object may also be also detected. Some or all of these features are added as information to the plane object.

Plane objects within each scene may then be snapped to architectural angles such as multiples of 45 degrees if they are already close to such angles (1303) and planes may be merged between scenes or existing merged plane objects may be split (1304). Methods such as RANSAC may be used to determine which plane objects should be merged into a single plane object or split apart. Combinatorial optimization techniques may also be applied, with terms based on goodness of fit of planes to be grouped together, such as those described herein, and terms based on the total number of groupings. Scene poses may be adjusted relative to each other to reduce the adjustments needed for plane objects which have been merged with plane objects in other scenes (1305). Plane objects may be snapped to global architectural angles based on a global coordinate system or global plane object 1306.

Step 1305, if performed, may occur after step 1304 but other than that, steps 1303, 1304, 1305, and 1306 may be performed in any order and may be performed multiple times or not at all. In other workflows, steps 1303, 1304, 1305, and 1306 may be repeated in this order or in other orders, some steps may be omitted, delayed, or performed in parallel or as part of a single optimization step, and steps may be performed only once. Similar techniques may be used to find cylindrical sections, spherical sections, or other parameterizable surfaces and use them for alignment purposes.

This plane alignment process may happen during the 3D capture process; for example, if one or more plane objects in each of two successively captured 3D scenes are matched with one another as being part of the same plane, these correspondences may be used to constrain the real-time alignment between these 3D scenes.

In general, all of the above methods may be used either during the live 3D capture process, during a post-capture global optimization, or both. Combinations of all of the above methods of preventing alignment drift or other methods may be used.

Augmented Reality Systems

Because the 3D reconstruction system may be capable of determining its position and orientation by aligning the current captured 3D data with existing 3D data of the object or environment being captured (via the visual and geometric methods described herein as well as other methods), it is possible to determine the location of the 3D reconstruction system relative to auxiliary data about that 3D environment in real time. Thus it is possible to use the 3D reconstruction system for augmented reality purposes.

Figure 3:
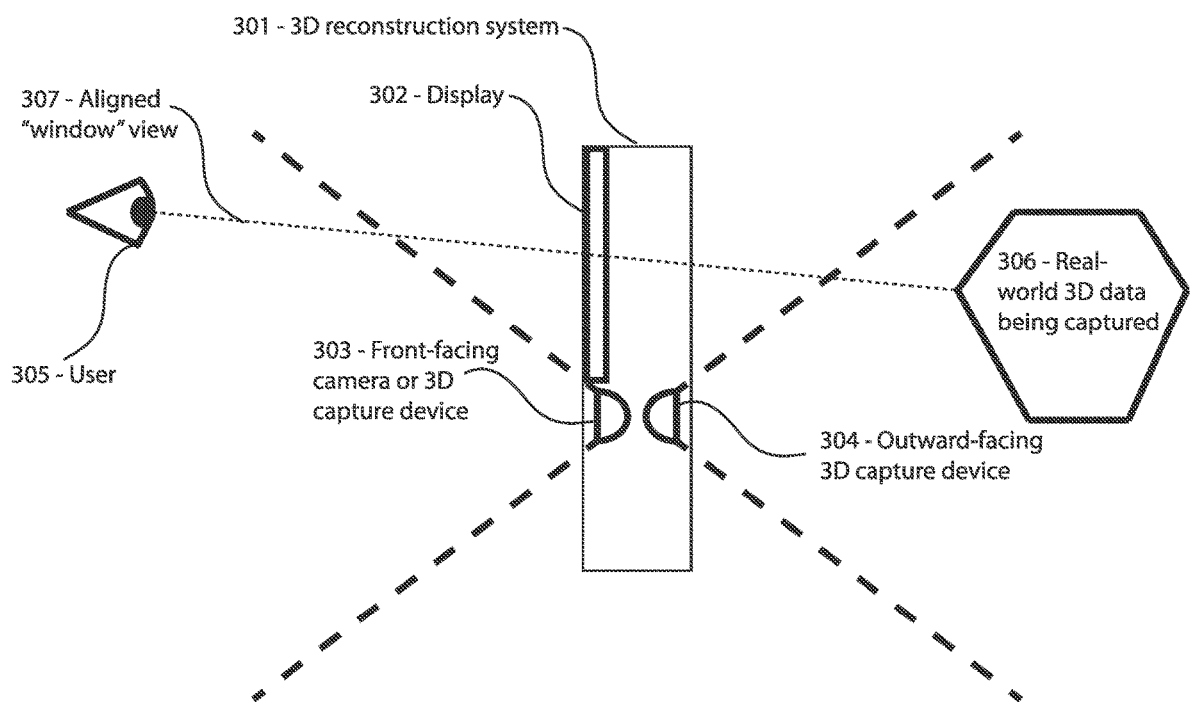
FIG. 3 illustrates an exemplary physical configuration for augmented reality.
Figure 4:
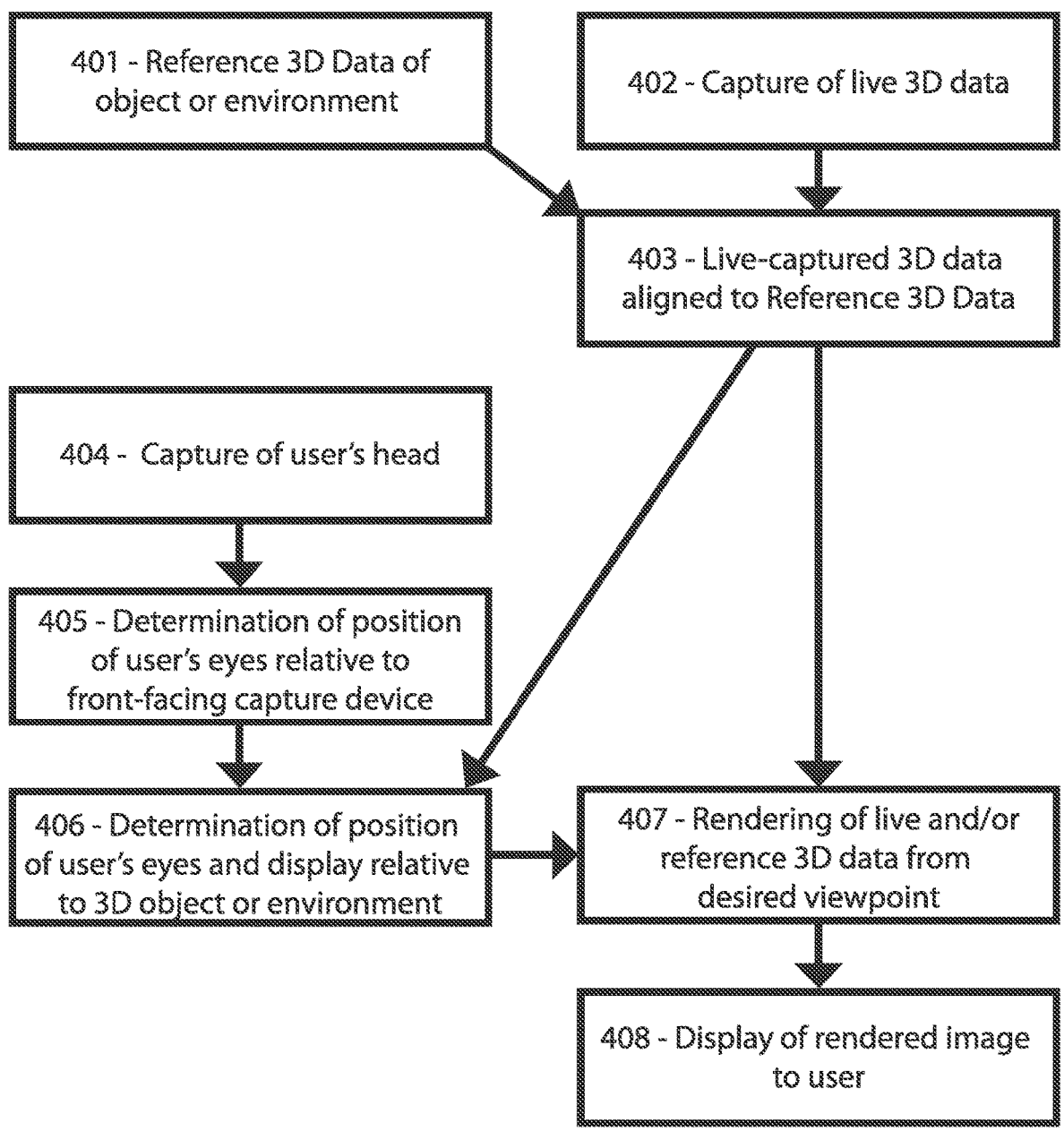
FIG. 4 illustrates an augmented reality process.

FIG. 3 shows a cross section of an exemplary physical configuration for a mobile 3D reconstruction system 301 capable of augmented reality. FIG. 4 shows a process by which the 3D reconstruction system 301 can perform the necessary computation to produce an augmented reality view. While the diagrams show a front-facing camera/3D capture device 303 and computation steps 404-406 to find the position of the user relative to the 3D reconstruction system 301, it should be understood that augmented reality data may still be aligned to real-world data and displayed from a particular viewpoint without these components. These components may be utilized to implement the "window" view described below.

A reference dataset 401 containing auxiliary 3D data that is spatially aligned 403 (using the 3D alignment techniques described herein or other techniques) to known captured 3D data of the object or environment being viewed 402 may be used as a source of information to display in an overlay to, in combination with, or in replacement of, the current captured scene 402 as seen by the outward-facing camera or 3D capture device 304. Types of auxiliary datasets include, but are not limited to:

Marks or labels identifying captured objects or locations; these marks may be manually or automatically (via image or object recognition algorithms) made during a current or prior capture of the environment or via a user of an external tool manipulating the captured 3D data, for example using the annotation interface described herein.

Images or 3D objects added in particular positions relative to a prior 3D capture of the same environment; for example, an interior decorator or other user may capture a 3D environment, import the 3D environment into a 3D design program, make changes and additions to the 3D environment, and then use the 3D reconstruction system to view how those changes and additions would appear in the environment.

3D data from a previous capture of the same object or environment; in this case, differences between prior 3D data and present 3D data may be highlighted.

A 3D CAD model of the object or environment being captured; in this case, differences between the CAD model and the present 3D data may be highlighted, which can be useful for finding defects in manufacturing or construction, or items that were incorrectly installed.

Data captured by additional sensors during a current or a prior 3D capture process.

A user-facing camera or 3D capture device 303 may be used to determine the position of the eyes of a user (305) and display 302 relative to captured object or environment 306. A front-facing camera 303 may capture data 404 and feed this data into a visual face detection algorithm 405 such as Viola-Jones to determine the position of the face of the user; the distance of the face may be determined using known typical values for the distance between the eyes. If a 3D capture device such as a stereo camera is used as front facing camera 303, the position of the eyes could be determined 405 via a combination of a visual or geometric face detection algorithm and distance measurements to the eyes on the face.

The position, orientation, and size of the display 302 relative to the front-facing camera/3D capture device 303 and outward-facing 3D capture device 304 are known based on their physical arrangement within 3D reconstruction system 301. If, in addition, the position of the eyes of the user (305) relative to the user-facing camera or 3D capture device 303 is known 405, and the position and orientation of the outward-facing 3D capture device 304 relative to the 3D environment 306 is known 403, then the position of the eyes of the user (305) and display 302 relative to the 3D object or environment 306 can be determined via coordinate transforms 406.

By rendering live 3D data, reference 3D data, or a combination thereof from the appropriate viewpoint 407 and then displaying it 408, the user could experience the display as an augmented reality "window" that provides a view 307 rendered so that their direct view of the world around them lines up with the view available through the display. The display may render the 3D data with a virtual camera perspective and field of view that corresponds to the position of the eyes of the user pointed at the display. Since the alignment, rendering, and display algorithms (402-408) may be capable of running real-time, 3D reconstruction system 301 may be moved around by the user, and the augmented data displayed on display 302 can update as the user and/or system moves. The display 302 may be partially or fully transparent, allowing the user to directly see the physical environment with additional information overlaid on the display.

Post-Processing of Captured 3D Data

Once multiple 3D scenes have been aligned, the data may be post-processed to extract various types of information. This post-processing may take place after all capture has finished, or it may occur as the 3D data continues to be captured. Potential post-processing may include:

Conversion of captured 3D points into a 3D surface representation such as a triangle mesh, a quad mesh, or NURBS. Numerous methods for converting 3D point cloud data to a 3D triangle mesh exist, such as Poisson Surface Reconstruction and Volumetric Range Image Processing (VRIP).

Generation of a 3D model that may be viewed in a web browser via WebGL, HTML5, Flash, or another standard.

Generation of floorplans, which may provide a top-down view of the aligned 3D data.

Generation of elevations, which may provide a side view of the aligned 3D data.

Generation of cross-sections, which may involve showing only data to one side of a plane or other delineation of 3D space Generation of an exploded view, in which segments of a captured object or environment (e.g., floors of a building) may be separated.

Recognition and/or segmentation of captured objects. Parts of the captured 3D data may be matched against (or aligned to) a database of 3D models of known objects. Objects may be counted for inventory or other purposes.

Extraction of higher-level structural data such as floors, walls, and beams. Techniques for extracting planes from captured 3D data are mentioned earlier in this patent; planes may be identified as floors, walls, or other entities based on orientation, position, and other factors. This data may be converted into a Building Information Model (BIM) format.

Extraction of 2D measurements of the size of and distance between planes and/or other surfaces. For example, a floorplan may be annotated with such measurements. Angles between walls in this floorplan may be adjusted slightly in order to conform to rectilinear assumptions in which walls that are near-perpendicular are expected to be perpendicular.

Extraction of the volume or surface area of a captured object or space.

Highlighting specific types of objects in a 2D or 3D model (e.g., all pipes of a certain range of diameters or all electrical outlets).

Conversion of the 3D points into a solid 3D model format (e.g., STL), potentially followed by 3D printing of the captured object or environment.

Online Database of Collected 3D Data

Data collected from multiple 3D capture sessions may be stored in an online database along with further identifying information for the sessions. Such information may include approximate geospatial location and time of scanning. The uploading of the data from a given 3D capture session may be automatic or may be triggered by user input. Approximate geospatial location may be determined based on user input, GPS, or other information.

The online database may run an alignment algorithm, such as the algorithm for aligning 3D scenes or 3D composite scenes, in order to align 3D capture data from different sessions in similar locations. This alignment algorithm may be repeatedly run in order to connect data from separate 3D capture sessions into a single globally aligned 3D model.

The online database may be browsed via a web interface that allows for interactive 3D viewing of 3D capture session data via WebGL, HTML5, Flash, or other technology. Search capabilities may be present, allowing for the searching for 3D capture session data by methods such as location, time, or other metadata, by the presence of objects recognized inside the 3D capture session data, or by alignment of 3D data corresponding to a query object to parts of the 3D capture session data. The online database may also be used for counting. Instances of a given object may be identified and counted.

The online database may be used for change detection. For example, 3D data from multiple capture sessions of a given area at different times may be aligned to one another and then examined for differences. If there is 3D data present from one session that is known to be empty space and not near captured 3D data in another session, the data may be highlighted as a change.

Fixed-Position Mounts

Figure 5:
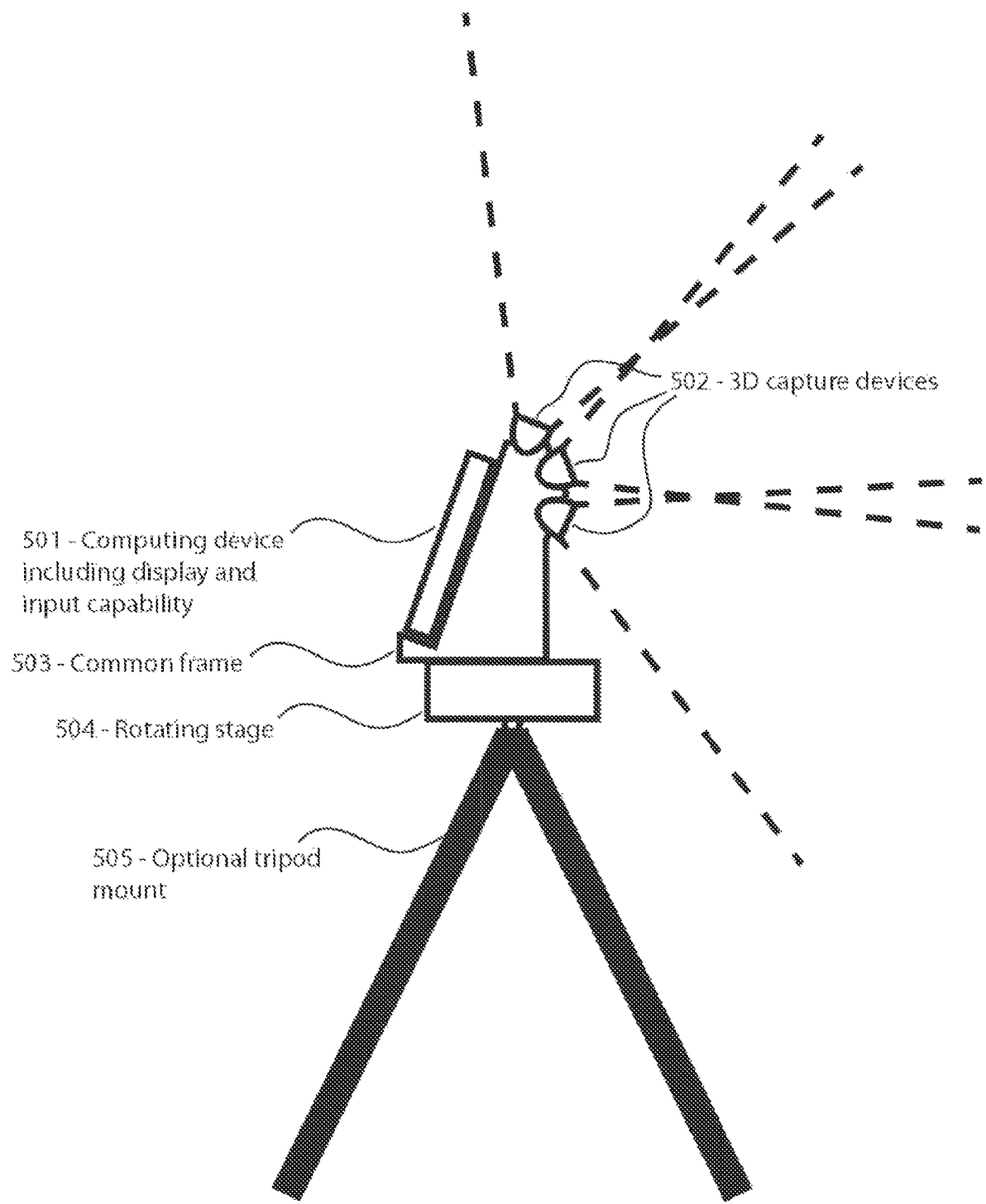
FIG. 5 illustrates an additional physical configuration for capturing 3D data.

In one alternative embodiment, an example of which is shown in FIG. 5, the 3D reconstruction system can rotate around a fixed-position mount. Such a configuration allows the system to capture a panoramic view from a given viewpoint. Between 3D captures, the system may be moved to a new location, either automatically by a robotic platform or manually by a human user. Panoramic 3D captures from multiple locations may be obtained, and the 3D scene alignment, graph optimization, and drift compensation methods mentioned herein may be used to align the panoramic 3D captures together.

Multiple 3D capture devices 502 may be used in order to provide a broad field of view, potentially covering a vertical angle that ranges from close to straight down to beyond straight up. A common frame 503 may hold and connect the 3D capture devices 502 and the computing device 501 that is used to control the capture process and display the results.

A rotating stage 504 may be used to rotate the 3D capture devices 502 as well as potentially other hardware. This rotating stage 504 may be motorized and controlled by computing device 501 or it may be manually rotated by a human user.

A motorized rotating stage may be accomplished via many means, including a gear driven rotation stage actuated by a stepper motor, servo motor, or other electric motor. Alternately, the stage may have directly driven rotation actuated by stepper motor, servo motor, or other electric motor. The rotating stage may also be spring-loaded via compression, a wound spring mechanism, or other technique such that a human user twists the stage to wind the spring. The device then rotates back over time using the power stored in the spring. A full rotation by the rotating stage 504 may provide an opportunity to capture a full 360 degree horizontal view of the area surrounding the 3D capture devices. The entire system 501-504 may be mounted on a tripod 505 to allow it to be placed at a desired height. Alternately, any system that allows controlled rotation or allows the current angle of rotation to be automatically read may be used in place of the rotating stage 504.

The computing device 501 in such an embodiment may take various forms. For example, it may be an off-the-shelf mobile computing device such as an Apple iPad or Android tablet. This device may be temporarily physically mounted onto the common frame 503 and electrically connected via a plug or docking station. Alternately, the device may be permanently mounted to the common frame. In another embodiment, the computing hardware is split across multiple locations. For example, one computing device may be internal to the common frame 503 while another is remote.

The remote computing device may take the form of a laptop or off-the-shelf mobile computing device such as a tablet or smartphone. The remote computing device may also partially or fully consist of one or more servers at a remote datacenter. The computing device on common frame 503 and the remote computing device may communicate via a wire or wirelessly using a protocol such as Bluetooth or 802.11. The display and input capability may be spread between the two or more computing devices, or they may entirely be on the remote computing device(s). For example, an off-the-shelf smartphone or tablet may be used to control the operation of the 3D reconstruction system (501, 502, 503, 504) and view the results of the capture and reconstruction process.

Figure 11:
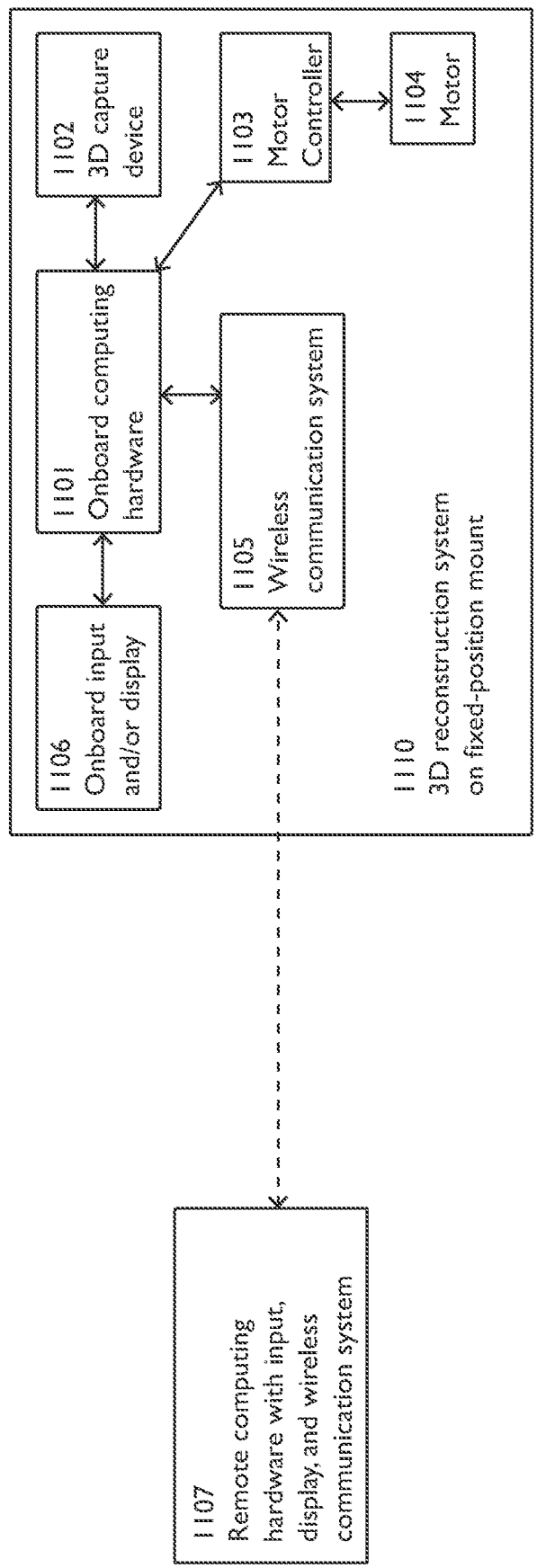
FIG. 11 illustrates data and control flow in a 3D reconstruction system utilizing a fixed-position mount.

FIG. 11 shows an example data and control flow for one embodiment of a 3D reconstruction system utilizing a fixed-position mount. A cluster of hardware on fixed-position mount 1110 captures and processes 3D data and may contain components 1101-1106 as well as other components. Onboard computing hardware 1101 may coordinate a range of activities. One or more 3D capture devices 1102 capture 3D data from the surrounding area and communicate the data to onboard computing hardware 1101. Onboard computing hardware 1101 may perform operations on the captured 3D data such as the alignment techniques described or otherwise referenced herein, merging, and/or decimation. Onboard computing hardware 1101 may also interface with motor controller 1103 to control motor 1104 and/or receive rotation angle information about motor 1104 to aid in the alignment process for the captured 3D data as the 3D capture device(s) 1102 rotate. Onboard computing hardware 1101 communicates with remote computing hardware 1107 via wireless communication system 1105.

Remote computing hardware 1107 may also perform operations on the 3D data such as the alignment techniques described or otherwise referenced herein, merging, and/or decimation. In one configuration, onboard computing hardware 1101 handles the alignment and merging of 3D data captured at a single location into a single collection of 3D data, while remote computing hardware 1107 handles alignment of multiple collections of 3D data captured at different locations and the display of aligned captured 3D data.

Remote computing hardware 1107 contains a wireless communication system and may contain a display for viewing captured 3D data as well as a control interface such as a touchscreen. This display and touchscreen may be used to control the operation of the 3D reconstruction system, for example using the methods described herein. The onboard computing hardware 1101 may also interact with an onboard input and/or display 1106. Examples of input include, but are not limited to, a power button, a button to trigger rotation, and a button to trigger a handheld capture mode as described herein. Examples of information that may be displayed include, but are not limited to, current battery life information or wireless login credentials. The onboard input and/or display 1106 may be used to control the operation of the 3D reconstruction system, for example using the methods described herein. Both the onboard computing hardware 1101 and the remote computing hardware 1107 may communicate with additional remote computing hardware such as a server in a datacenter.

FIG. 14 shows a cross section of an example physical configuration for one embodiment of a 3D reconstruction system utilizing a fixed-position mount. FIG. 14 illustrates a common physical mount 1410 and rotating stage 1406 that provide rigid mounting for one or more 3D capture devices 1401, onboard computing hardware 1402, battery module 1403, wireless communication system 1404, motor controller 1405, and protective outer covering 1414. Data connections 1411 allow communication between onboard computing hardware 1402 and other components (1401, 1403, 1404, 1405) as well as between motor controller 1405 and rotating stage 1406. These data connections 1411 may also provide power for various components. Additional electrical power connections 1412 or other couplings may be used for powering specific components.

Rotating stage 1406 rotates itself and components attached to said stage and the common physical mount 1410 relative to an external mount such as adapter plate 1407 and the tripod (1408, 1409) linked to it. Adapter plate 1407 allows a standard tripod quick-release plate 1408 to be rigidly attached to adapter plate 1407, allowing the overall 3D reconstruction system to be easily mounted and dismounted from tripod 1409.

The physical configuration and choice of components shown in FIG. 14 is just one of a range of possibilities. Multiple means of implementing a rotating stage, such as those described herein, may be used. The external mount (1407-1409) may alternately consist of a fixed single mount, a segmented mount such as a Gorilla Pod, a robotic platform, or other alternatives. Some components may be arranged differently; for example, communication module 1404 may be built into onboard computing hardware 1402, rotating stage 1406 may contain motor controller 1405, battery module 1403 may have an external electrical circuit for battery management, motor controller 1405 may also handle battery management, and one or more additional components (eg 1401, 1404) may receive power directly from battery module 1403 instead of via onboard computing hardware 1402. Data communication 1411 may take place via a variety of protocols such as I2C, USB 2.0, USB 3.0, Thunderbolt, Ethernet, and Firewire.

One or more 3D capture devices 1401 may be arranged to cover a particular field of view. Capture devices may be arranged along an inward arc (as shown), outward arc, or other configuration. Their fields of view 1413 may be arranged such that there is a region of overlap between adjacent pairs of 3D capture devices 1401, creating a larger continuous field of view. Onboard computing hardware 1402 receives and optionally processes data captured from 3D capture devices 1401. Such processing may include aggregation, merging, and/or decimation of captured 3D scenes over the course of a rotation, alignment of multiple captured 3D scenes, and other processing steps such as those described or otherwise referenced herein.

Onboard computing hardware 1402 may also interface with motor controller 1405 to control rotating stage 1406 and/or receive rotation angle information about rotating stage 1406 to aid in the alignment process for the captured 3D data as the 3D capture device(s) 1401 rotate. Onboard computing hardware 1402 communicates with remote computing hardware (not shown) via wireless communication system 1404. Remote computing hardware may also perform operations on the 3D data such as the alignment techniques described or otherwise referenced herein, merging, and/or decimation. In one configuration, onboard computing hardware 1402 handles the alignment and merging of 3D data captured at a single location into a single collection of 3D data, while remote computing hardware (not shown) handles alignment of multiple collections of 3D data captured at different locations and the display of aligned captured 3D data.

If multiple 3D capture devices 502 are used, they may need to be calibrated so that data captured by them can be placed into a single 3D space. This calibration may be done during the manufacturing process, before each 3D capture session, continuously, or at another interval. If the position and angle of each 3D capture device is known to an acceptable degree of precision, then the 3D capture devices may be calibrated simply by applying the necessary coordinate transforms to map the position and angle of capture to a shared reference position and orientation.

Alternately, the positions but not the angles of the 3D capture devices may be known to an acceptable degree of precision. In this case, the angles may be determined by a variety of methods. For example, the 3D capture devices may be pointed at a flat surface. The flat surface may be detected within the data captured by each 3D capture device, and then the relative angles of the 3D capture devices may be devised by solving for the 3D capture device orientations that bring each capture of the flat surface into alignment with one another given a known position for each 3D capture device.

Alternately, the 3D capture devices may be calibrated using a pairwise alignment and/or graph optimization process. In this case, the search space of possible alignments may be constrained since the relative position and approximate relative angles of the 3D capture devices may be known. A calibration target such as a checkerboard may be placed on a wall to aid in the alignment process, or the alignment parameters may be derived over time as data from physical objects is captured as part of the normal operation of the device.

Since the 3D capture devices may be on a fixed-position mount, the process of aligning multiple 3D captures from a single position may be handled via sensor information. The horizontal rotational angle of the 3D capture devices may be determined directly from the rotating stage 504. For example, the rotating stage 504 may contain a ring encoder that outputs the current angle electrically to computing device 501, or it may be driven by computing device 501 using a stepper motor that can rotate the stage by a particular angle.

Alternately, the rotating stage may rotate at a reliable and known speed. By accounting for this rotation as well as the 3D capture devices' positions and angles relative to the center of rotation in a coordinate transformation to the captured 3D data, all captured 3D data from a single position may be aligned and merged into a common coordinate space. As an alternative, visual movement information such as optical flow or tracked features detected in the images of the 3D capture devices over time may be used to come up with an estimate of the amount of rotation.

As another alternative, sensors such as accelerometers, inertial measurement units, gyros, and compasses may be used to estimate angle of rotation. The rotation estimates derived from additional hardware sensors or software processing may be used to do the final alignment between 3D captures, or it may be used simply as an initial estimate, with final alignment between 3D captures accomplished using a pairwise alignment and/or graph optimization process.

The panoramic 3D data captured from multiple different positions may be aligned and merged together using an alignment and/or graph optimization process. This global alignment may happen after or in conjunction with refinement of the alignment of the 3D captures taken at a particular position.

Panoramic 3D data may also be aligned and merged with 3D scenes captured using a handheld 3D capture system. This handheld 3D capture system may consist of a separate 3D capture device that is connected to computing device 501 when a handheld scan is desired. Alternately, the 3D reconstruction system itself (501, 502, 503, 504) or some part thereof may be used for handheld capture. For example, the 3D capture devices 502 may detach from the rest of the system, or the entire system may be lifted off the tripod and moved freely.

In an alternative embodiment, a ball mount or other connection that allows for rotation along two or three degrees of freedom may be used in place of rotating stage 504. As before, the rotation angles may be determined via any combination of ring encoders, stepper motors, accelerometers, IMUs, gyros, compasses, computer vision techniques such as optical flow or tracked features, or other techniques.

In another alternative embodiment, a simple motor may be used in place of rotating stage 504. As the rotation rate of such a motor may be unpredictable, a visual method of alignment such as the ones described herein may be used to align the 3D data captured during the rotation process.

The foregoing detailed description of the presently claimed invention has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the presently claimed invention be defined by the claims appended hereto.

What is claimed is:

1. A system for building a three-dimensional composite scene, the system comprising:
    a three-dimensional capture device for capturing a plurality of three-dimensional images of an object or an environment at different capture positions relative to a three-dimensional coordinate space over a capture process, each of the plurality of three-dimensional images including metadata;
    a processor for executing instructions stored in memory, the processor being remote to the three-dimensional capture device, wherein execution of the instructions by the processor includes:
        receiving the plurality of three-dimensional images of the object or the environment; and
        aligning the received plurality of three-dimensional images to generate a three-dimensional representation of the object or the environment, the aligning being based on the metadata associated with each of the received plurality of three-dimensional images; and
    an interface device for displaying at least a part of the three-dimensional representation of the object or the environment, the interface device including a live display area configured to display a live video feed of the three-dimensional representation as it is captured by the three-dimensional capture device, the interface device further including a secondary display area that provides an indication of an area of the object or environment that the three-dimensional capture device should be aimed at to capture a three-dimensional data object of the three-dimensional data objects that facilitates alignment of other three-dimensional data objects of the three-dimensional data objects.

2. The system of claim 1, wherein the interface device is remote to the three-dimensional capture device.

3. The system of claim 1, wherein the aligning the received plurality of three-dimensional images is done iteratively.

4. The system of claim 1, wherein the metadata includes distance information for features included in the plurality of three-dimensional images.

5. The system of claim 4, wherein the aligning the received plurality of three-dimensional images is based on the distance information for the features respectively included therein and aligning the features to one another in the three-dimensional coordinate space based on the distance information to generate the three-dimensional representations of the object or the environment concurrently with the capture process.

6. The system of claim 1, wherein the three-dimensional capture device includes a transmitter to wirelessly transmit the plurality of three-dimensional images to the processor.

7. The system of claim 1, wherein the system further includes a rotatable stage on which the three-dimensional capture device is mounted thereon.

8. A system for building a three-dimensional composite scene, the system comprising:
    a three-dimensional capture device for capturing a plurality of three-dimensional images of an object or an environment at different capture positions relative to a three-dimensional coordinate space over a capture process, each of the plurality of three-dimensional images including metadata; and a processor for executing instructions stored in memory, the processor being remote to the three-dimensional capture device, wherein execution of the instructions by the processor includes:

receiving the plurality of three-dimensional images of the object or the environment;

aligning the received plurality of three-dimensional images to generate a three-dimensional representation of the object or the environment, the aligning being based on the metadata associated with each of the received plurality of three-dimensional images; and an interface device for displaying at least a part of the three-dimensional representation of the object or the environment, the interface device being configured to generate a prompt in response to a failure to align a subset of three-dimensional data, objects of the three-dimensional data objects, wherein the prompt requests user input identifying an area of or around the three-dimensional representation to attempt realignment.

9. The system of claim 1, wherein the interface device is configured to identify holes in the three-dimensional representation.

10. A system comprising:

a processor; and a memory including executable instructions to configure the processor to receive a plurality of three-dimensional images of an object or an environment from a three-dimensional capture device captured by the three-dimensional capture device at different positions relative a three-dimensional coordinate space during a capture process, each of the plurality of three-dimensional images including metadata, and send the plurality of three-dimensional images to a remote processing system as they are respectively received, wherein the remote processing system is configured to align the plurality of three-dimensional images to generate a three-dimensional representation of the object or the environment, the align the plurality of three-dimensional images being based on the metadata associated with each of the plurality of three-dimensional images, sending the three-dimensional representation of the object or the environment to a remote display for rendering, the remote display including a live display area to display a live video feed of the three-dimensional representation of the object or the environment as it is received from the three-dimensional capture device, the remote display further including a secondary display area that provides an indication of an area of the object or environment that the three-dimensional capture device should be aimed at to capture a three-dimensional data object of the three-dimensional data objects that facilitates alignment of other three-dimensional data objects of the three-dimensional data objects.

11. The system of claim 10, wherein the align the plurality of three-dimensional images is done iteratively.

12. The system of claim 10, wherein the metadata includes distance information for features included in the plurality of three-dimensional images.

13. The system of claim 12, wherein the align the received plurality of three-dimensional images is based on the distance information for the features respectively included therein and align the features to one another in the three-dimensional coordinate space based on the distance information to generate the three-dimensional representations of the object or the environment concurrently with the capture process.

14. A method comprising:

capturing, by a three-dimensional capture device, a plurality of three-dimensional images of an object or an environment at different capture positions relative to a three-dimensional coordinate space over a capture process, each of the plurality of three-dimensional images including metadata;

receiving, by a processor remote to the three-dimensional capture device, the plurality of three-dimensional images of the object or the environment;

aligning the received plurality of three-dimensional images to generate a three-dimensional representation of the object or the environment, the aligning being based on the metadata associated with each of the received plurality of three-dimensional images;

displaying, by an interface device, at least a part of the three-dimensional representation of the object or the environment, the interface device including a live display area configured to display a live video feed of the three-dimensional representation as it is captured by the three-dimensional capture device; and providing, by a secondary display area of the interface device, an indication of an area of the object or environment that the three-dimensional capture device should be aimed at to capture a three-dimensional data object of the three-dimensional data objects that facilitates alignment of other three-dimensional data objects of the three-dimensional data objects.

15. The method of claim 14, wherein the interface device is remote to the three-dimensional capture device.

16. The method of claim 14, wherein the aligning the received plurality of three-dimensional images is done iteratively.

17. The method of claim 14, wherein the metadata includes distance information for features included in the plurality of three-dimensional images.

18. The method of claim 17, wherein the aligning the received plurality of three-dimensional images is based on the distance information for the features respectively included therein and align the features to one another in the three-dimensional coordinate space based on the distance information to generate the three-dimensional representations of the object or the environment concurrently with the capture process.

19. A system comprising:

a processor; and a memory including executable instructions to configure the processor to:

receive a plurality of three-dimensional images of an object or an environment from a three-dimensional capture device captured by the three-dimensional capture device at different positions relative a three-dimensional coordinate space during a capture process, each of the plurality of three-dimensional images including metadata, and send the plurality of three-dimensional images to a remote processing system as they are respectively received, wherein the remote processing system is configured to align the plurality of three-dimensional images to generate a three-dimensional representation of the object or the environment, the align the plurality of three-dimensional images being based on the metadata associated with each of the plurality of three-dimensional images, sending the three-dimensional representation of the object or the environment to a remote display for rendering, the remote display generating a prompt in response to a failure to align a subset of three-dimensional data, objects of the three-dimensional data objects, the prompt requesting user input identifying an area of or around the three-dimensional representation to attempt realignment.

20. A method comprising:

capturing, by a three-dimensional capture device, a plurality of three-dimensional images of an object or an environment at different capture positions relative to a three-dimensional coordinate space over a capture process, each of the plurality of three-dimensional images including metadata;

receiving, by a processor remote to the three-dimensional capture device, the plurality of three-dimensional images of the object or the environment;

aligning the received plurality of three-dimensional images to generate a three-dimensional representation of the object or the environment, the aligning being based on the metadata associated with each of the received plurality of three-dimensional images;

displaying, by an interface device, at least a part of the three-dimensional representation of the object or the environment; and generating, by the interface device, a prompt in response to a failure to align a subset of three-dimensional data, objects of the three-dimensional data objects, the prompt requesting user input identifying an area of or around the three-dimensional representation to attempt realignment.

* * * * *